US012382238B2

(12) United States Patent
Olivieri et al.

(10) Patent No.: US 12,382,238 B2
(45) Date of Patent: Aug. 5, 2025

(54) XR RENDERING FOR 3D AUDIO CONTENT AND AUDIO CODEC

(71) Applicant: QUALCOMM Incorporated, San Diego, CA (US)

(72) Inventors: Ferdinando Olivieri, Carlsbad, CA (US); Taher Shahbazi Mirzahasanloo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/444,138

(22) Filed: Jul. 30, 2021

(65) Prior Publication Data
US 2023/0051841 A1 Feb. 16, 2023

(51) Int. Cl.
| | |
|---|---|
| H04S 7/00 | (2006.01) |
| G02B 27/00 | (2006.01) |
| G02B 27/01 | (2006.01) |
| G06F 3/01 | (2006.01) |
| G10L 19/008 | (2013.01) |
| H04R 5/04 | (2006.01) |

(52) U.S. Cl.
CPC .......... H04S 7/303 (2013.01); G02B 27/0093 (2013.01); G02B 27/017 (2013.01); G06F 3/013 (2013.01); G10L 19/008 (2013.01); H04R 5/04 (2013.01); G02B 2027/0147 (2013.01); H04S 2400/01 (2013.01); H04S 2400/11 (2013.01); H04S 2420/01 (2013.01)

(58) Field of Classification Search
CPC ...... H04S 7/303; H04S 7/304; H04S 2400/11; H04S 2420/01; H04S 2420/11; G10L 19/008
See application file for complete search history.

(56) References Cited

U.S. PATENT DOCUMENTS

| | | | |
|---|---|---|---|
| 2014/0355769 A1 | 12/2014 | Peters et al. | |
| 2017/0374484 A1* | 12/2017 | Lando | G10L 19/008 |
| 2018/0343534 A1 | 11/2018 | Norris et al. | |
| 2019/0356894 A1 | 11/2019 | Oh et al. | |
| 2019/0392846 A1* | 12/2019 | Kim | H03M 7/6011 |

(Continued)

FOREIGN PATENT DOCUMENTS

WO 2020153092 A1 7/2020

OTHER PUBLICATIONS

International Search Report and Written Opinion - PCT/US2022/073499—ISA/EPO—Oct. 5, 2022.

*Primary Examiner* — Ping Lee
(74) *Attorney, Agent, or Firm* — QUALCOMM Incorporated; Espartaco Diaz Hidalgo

(57) ABSTRACT

A device includes a memory configured to store instructions and also includes one or more processors configured to execute the instructions to obtain audio data corresponding to a sound source and metadata indicative of a direction of the sound source. The one or more processors are configured to execute the instructions to obtain direction data indicating a viewing direction associated with a user of a playback device. The one or more processors are configured to execute the instructions to determine a resolution setting based on a similarity between the viewing direction and the direction of the sound source. The one or more processors are also configured to execute the instructions to process the audio data based on the resolution setting to generate processed audio data.

30 Claims, 14 Drawing Sheets

(56) References Cited

U.S. PATENT DOCUMENTS

2020/0162833 A1\* 5/2020 Lee .......................... H04R 5/02
2020/0382894 A1   12/2020 Walsh et al.
2021/0366497 A1\* 11/2021 Lim ...................... G10L 19/032

\* cited by examiner

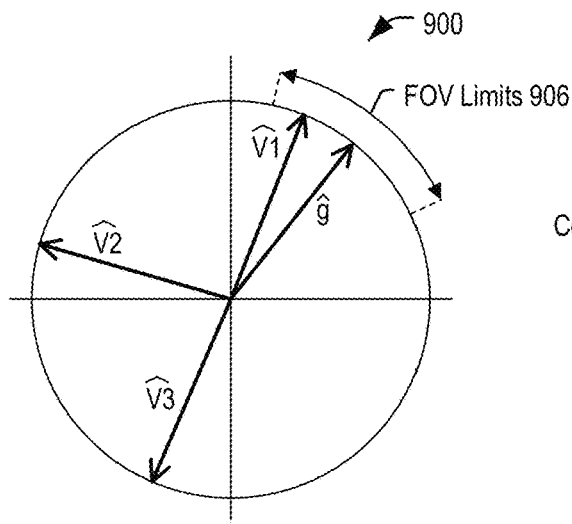
FIG. 9A
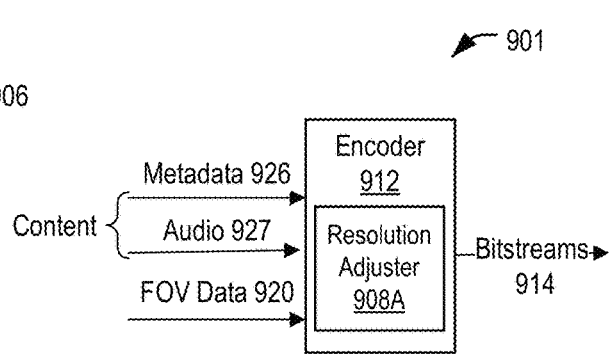
FIG. 9B
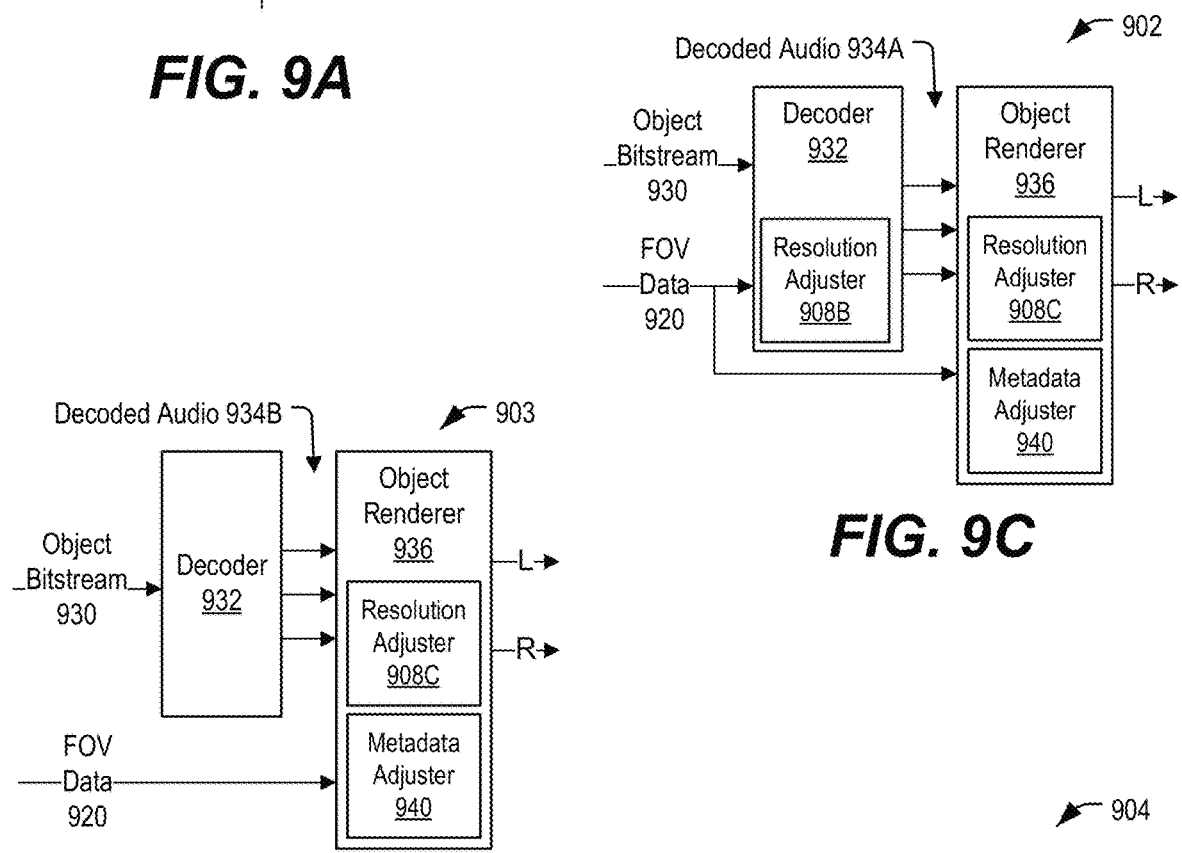
FIG. 9C
FIG. 9D
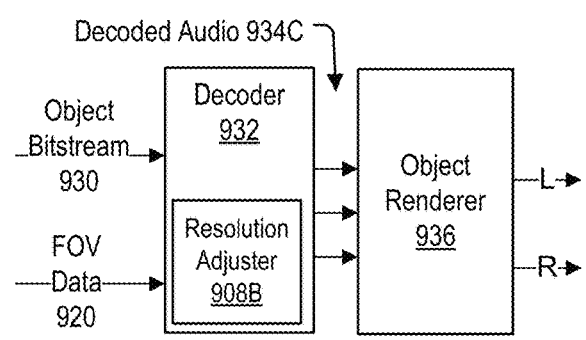
FIG. 9E

XR RENDERING FOR 3D AUDIO CONTENT AND AUDIO CODEC

I. FIELD

The present disclosure is generally related to processing spatial audio data.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

One application of such devices includes providing wireless immersive audio to a user. As an example, a playback device worn by a user, such as a headphone device, can receive streaming audio data from a remote server for playback to the user. The headphone device detects a rotation of the user's head, updates an audio scene based on the head tracking information, generates binaural audio data based on the updated audio scene, and plays out the binaural audio data to the user.

Performing audio scene updates and binauralization enables the user to experience an immersive audio experience via a headphone device. However, providing an immersive audio experience requires a large amount of audio data to be transmitted and substantial processing operations to update and render the audio scene for playback. As a result, playback of immersive audio data at the headphone device may be limited by an amount of available wireless bandwidth, processing resources, or battery capacity, thus impairing the user's experience.

III. SUMMARY

According to a particular implementation of the techniques disclosed herein, a device includes a memory configured to store instructions. The device also includes one or more processors configured to execute the instructions to obtain audio data corresponding to a sound source and metadata indicative of a direction of the sound source. The one or more processors are configured to execute the instructions to obtain direction data indicating a viewing direction associated with a user of a playback device. The one or more processors are configured to execute the instructions to determine a resolution setting based on a similarity between the viewing direction and the direction of the sound source. The one or more processors are also configured to execute the instructions to process the audio data based on the resolution setting to generate processed audio data.

According to a particular implementation of the techniques disclosed herein, a method includes obtaining, at one or more processors, audio data corresponding to a sound source and metadata indicative of a direction of the sound source. The method includes obtaining, at the one or more processors, direction data indicating a viewing direction associated with a user of a playback device. The method includes determining, at the one or more processors, a resolution setting based on a similarity between the viewing direction and the direction of the sound source. The method also includes processing, at the one or more processors, the audio data based on the resolution setting to generate processed audio data.

According to a particular implementation of the techniques disclosed herein, an apparatus includes means for obtaining audio data corresponding to a sound source and metadata indicative of a direction of the sound source. The apparatus includes means for obtaining direction data indicating a viewing direction associated with a user of a playback device. The apparatus includes means for determining a resolution setting based on a similarity between the viewing direction and the direction of the sound source. The apparatus includes means for processing the audio data based on the resolution setting to generate processed audio data.

According to a particular implementation of the techniques disclosed herein, a non-transitory computer-readable medium includes instructions that, when executed by one or more processors, cause the one or more processors to obtain audio data corresponding to a sound source and metadata indicative of a direction of the sound source. The instructions, when executed, cause the one or more processors to obtain direction data indicating a viewing direction associated with a user of a playback device. The instructions, when executed, cause the one or more processors to determine a resolution setting based on a similarity between the viewing direction and the direction of the sound source. The instructions, when executed, cause the one or more processors to process the audio data based on the resolution setting to generate processed audio data.

Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 9A is a diagram illustrating a graphical example of a gaze direction and directions to multiple sound sources, in accordance with some examples of the present disclosure.

FIG. 9B is a block diagram illustrating an example of components of a system operable to adjust, based on a viewing direction, a resolution setting associated with audio processing, in accordance with some examples of the present disclosure.

FIG. 9C is a block diagram illustrating another example of components of a system operable to adjust, based on a viewing direction, a resolution setting associated with audio processing, in accordance with some examples of the present disclosure.

FIG. 9D is a block diagram illustrating another example of components of a system operable to adjust, based on a viewing direction, a resolution setting associated with audio processing, in accordance with some examples of the present disclosure.

FIG. 9E is a block diagram illustrating another example of components of a system operable to adjust, based on a viewing direction, a resolution setting associated with audio processing, in accordance with some examples of the present disclosure.

V. DETAILED DESCRIPTION

Figure 1:
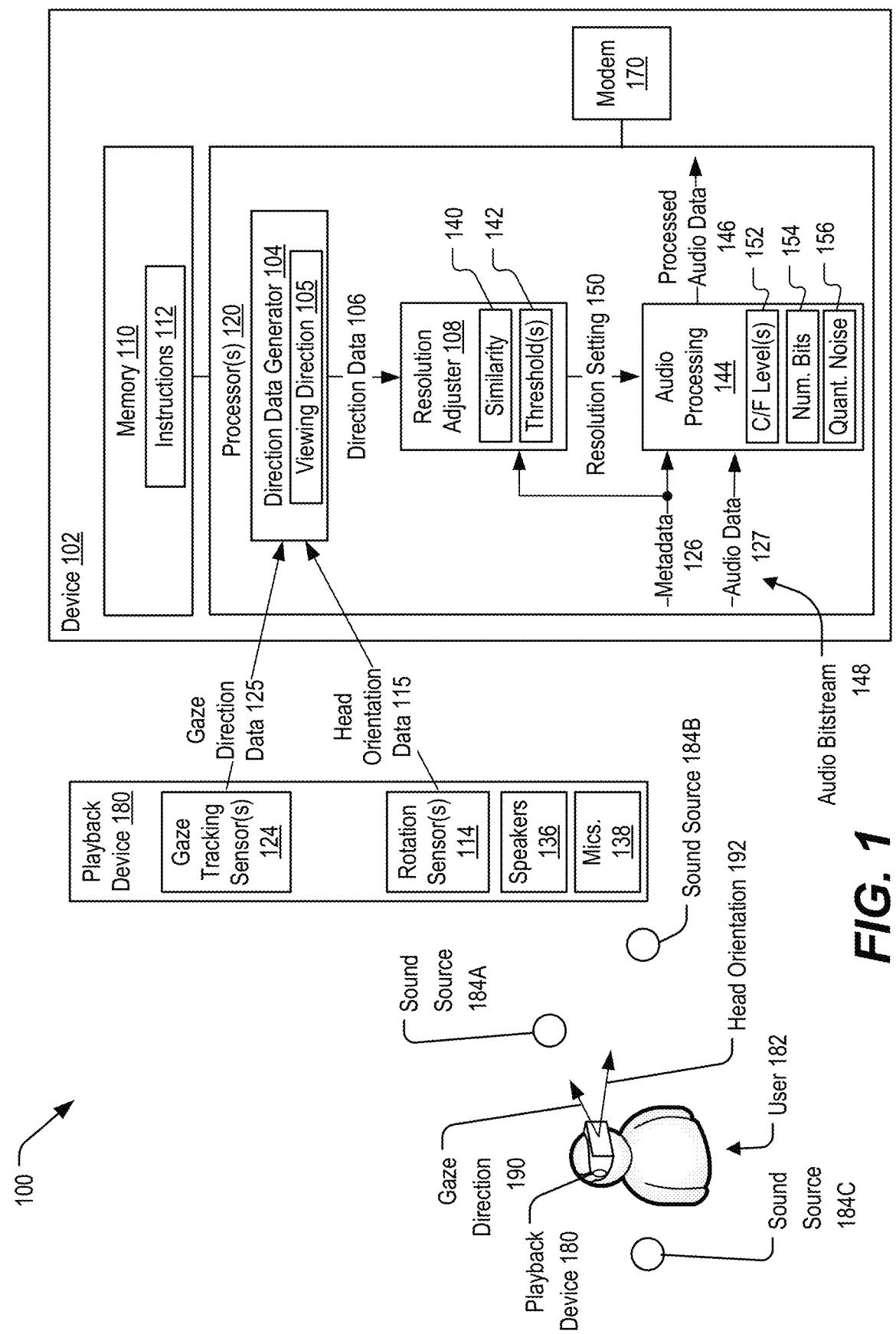
FIG. 1 is a diagram illustrating an example of an implementation of a system operable to adjust, based on a viewing direction, a resolution setting associated with audio processing, in accordance with some examples of the present disclosure.

Providing an immersive audio experience requires a large amount of audio data to be transmitted and substantial processing operations to update and render the audio scene for playback, which may be difficult to perform at playback devices that may have relatively limited available wireless bandwidth, processing resources, or battery capacity, thus impairing the user's experience.

Systems and methods are described in which a resolution of one or more operations associated with spatial audio processing may be adjusted based on the location of the source of the audio data. For example, audio from sources that are located relatively near to the center of the user's vision may be generated using higher resolution than audio from sources that are located relatively far from the center of the user's vision. In some implementations, a user gaze direction is determined and compared to a direction of one or more audio sources to determine an amount of resolution (e.g., number of bits, a coarse or fine resolution level, an amount of quantization noise, etc.) to be used when processing audio from each of the audio sources. A high resolution may be used to provide enhanced audio quality for sound sources in directions near the user's gaze direction that the user is more likely to notice or to be paying attention to, while reducing the amount of resolution for audio from sources that are far from the user's gaze direction enables reduction of the processing load, latency, bandwidth, power consumption, or a combination thereof, that is associated with processing the audio data. Since the reduced resolution is used for audio from sources that are farther from the user's gaze direction, or outside the user's field of view, a reduced resolution of the audio associated from such sources may not be perceived by the user.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

In general, techniques are described for coding of 3D sound data, such as ambisonics audio data. Ambisonics audio data may include different orders of ambisonic coefficients, e.g., first order or second order and more (which may be referred to as Higher-Order Ambisonics (HOA) coefficients corresponding to a spherical harmonic basis function having an order greater than one). Ambisonics audio data may also include Mixed Order Ambisonics (MOA). Thus, ambisonics audio data may include at least one ambisonic coefficient corresponding to a harmonic basis function.

The evolution of surround sound has made available many audio output formats for entertainment. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, and various formats that includes height speakers such as the 7.1.4 format and the 22.2 format (e.g., for use with the Ultra High Definition Television standard). Non-consumer formats can span any number of speakers (e.g., in symmetric and non-symmetric geometries) often termed 'surround arrays'. One example of such a sound array includes 32 loudspeakers positioned at coordinates on the corners of a truncated icosahedron.

The input to an encoder, such as a Moving Picture Experts Group (MPEG) encoder, may be optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); or (iii) scene-based audio, which involves representing the sound field using coefficients of spherical harmonic basis functions (also called "spherical harmonic coefficients" or SHC, "Higher-order Ambisonics" or HOA, and "HOA coefficients"). Such an encoder may be described in more detail in a document entitled "Call for Proposals for 3D Audio," by the International Organization for Standardization/International Electrotechnical Commission (ISO)/(IEC) JTC1/SC29/WG11/N13411, released January 2013 in Geneva, Switzerland, and available at http://mpeg.chariglione.org/sites/default/files/files/standards/parts/docs/w13411.zip.

There are various 'surround-sound' channel-based formats currently available. The formats range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce a soundtrack for a movie once, and not spend effort to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a sound field. The hierarchical set of elements may refer to a set of elements in which the elements are ordered such that a basic set of lower-ordered elements provides a full representation of the modeled sound field. As the set is extended to include higher-order elements, the representation becomes more detailed, increasing resolution.

One example of a hierarchical set of elements is a set of spherical harmonic coefficients (SHC). The following expression demonstrates a description or representation of a sound field using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the sound field, at time t, can be represented uniquely by the SHC, $A_n^m(k)$. Here, $$k = \frac{\omega}{c},$$

c is me speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the sound field. The SHC represent scene-based audio, where the SHC may be input to an audio encoder to obtain encoded SHC that may promote more efficient transmission or storage. For example, a fourth-order representation involving $(4+1)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k) = g(\omega)(-4\pi i k) h_n^{(2)}(k r_s) Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy g(w) as a function of frequency (e.g., using time-frequency analysis techniques, such as performing a fast Fourier transform on the PCM stream) enables conversion of each PCM object and the corresponding location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, the coefficients contain information about the sound field (the pressure as a function of 3D coordinates), and the above represents the transformation from individual objects to a representation of the overall sound field, in the vicinity of the observation point $\{r_r, \theta_r, \varphi_r\}$.

Referring to FIG. 1, a particular illustrative aspect of a system configured to adjust, based on a viewing direction, a resolution setting associated with audio processing is depicted and generally designated 100. The system 100 includes a device 102 coupled to a playback device 180. The playback device 180 is also illustrated being worn by a user 182 in the vicinity of a first sound source 184A, a second sound source 184B, and a third sound source 184C.

The playback device 180 includes one or more gaze tracking sensors 124, one or more rotation sensors 114, multiple speakers 136, and multiple microphones 138. The one or more gaze tracking sensors 124 are configured to generate gaze tracking sensor data and can include one or more cameras configured to perform optical tracking, one or more devices configured to measure electrical potential fields associated with eye movement, one or more other sensors configured to determine a gaze direction 190 of the user 182, such as an eye-attached tracking device, or a combination thereof. Data indicative of the gaze direction 190 is provided to the device 102 as gaze direction data 125.

The one or more rotations sensors 114 are configured to generate sensor data indicative of a movement of the head of the user 182, a pose of the head of the user 182, movement of the playback device 180, a pose of the playback device 180, or a combination thereof, to determine a head orientation 192 of the user 182. In implementations in which the playback device 180 is worn on the user's head, such as illustrated in FIG. 1, movement of the playback device 180 can correspond to movement of the head of the user 182. As used herein, the "pose" of the playback device 180 indicates a location and an orientation of the playback device 180. According to some aspects, the one or more rotation sensors 114 include one or more inertial sensors such as accelerometers, gyroscopes, compasses, positioning sensors (e.g., a global positioning system (GPS) receiver), magnetometers, inclinometers, optical sensors, one or more other sensors to detect acceleration, location, velocity, acceleration, angular orientation, angular velocity, angular acceleration, or any combination thereof, of the playback device 180. In one example, the one or more rotation sensors 114 include GPS, electronic maps, and electronic compasses that use inertial and magnetic sensor technology to determine direction, such as a 3-axis magnetometer to measure the Earth's geomagnetic field and a 3-axis accelerometer to provide, based on a direction of gravitational pull, a horizontality reference to the Earth's magnetic field vector. In some examples, the one or more sensors 244 include one or more optical sensors (e.g., cameras) to track movement, individually or in conjunction with one or more other sensors (e.g., inertial sensors). In an implementation in which the playback device 180 is a handheld device of the user, such as a smart phone or a tablet computer device, the head orientation 192 of the user 182 can be determined based on a combination of an inertial measurement of the pose of the playback device 180 and detection of head pose relative to the playback device 180 by processing of images of the head of the user 182 captured by a user-facing camera of the playback device 180. Data indicative of the head orientation 192 is provided to the device 102 as head orientation data 115.

The device 102 includes a memory 110 coupled to one or more processors 120 and configured to store instructions 112. The one or more processors 120 are configured to execute the instructions 112 to perform operations associated with a direction data generator 104, a resolution adjuster 108, and audio processing 144. In an illustrative example, the device 102 corresponds to a portable electronic device, such as a tablet computer or a smart phone, that has greater processing and battery resources than the playback device 180.

The one or more processors 120 are configured to obtain audio data 127 corresponding to a sound source and metadata 126 indicative of a direction of the sound source. As used herein, "metadata" refers to data indicating a position or direction of a sound source in an audio scene, such as V-vectors in implementations using an ambisonics transport format representation of the audio scene (e.g., as described further with reference to FIG. 3), or object position data using an audio object format representation of the audio scene (e.g., as described further with reference to FIG. 9), as illustrative, non-limiting examples. As used herein, "audio data" refers to data indicating a signal amplitude or energy associated with a sound source, such as one or more U-vectors in an implementation that uses an ambisonics transport format representation of the audio scene, as an illustrative, non-limiting example.

An audio bitstream 148 that includes the audio data 127 and the metadata 126 may be received from another device, such as audio captured via the microphones 138 of the playback device 180, audio retrieved from a media file, game engine, or other source within the device 102, or audio streamed from another device such as a remote server, as illustrative, non-limiting examples. In an example, the audio bitstream 148 includes ambisonics data corresponding to a 3D audio scene, such as described further with reference to FIG. 3. In another example, the audio bitstream 148 includes audio object coding format data corresponding to a 3D audio scene in which audio objects correspond to sound sources. The audio object coding format data includes an audio signal and object direction metadata for each object of multiple objects, such as described further with reference to FIG. 9B.

The one or more processors 120 are configured to obtain direction data 106 indicating a viewing direction 105 associated with the user 182 of the playback device 180. For example, the direction data generator 104 is configured to process the gaze direction data 125, the head orientation data 115, or both, to determine the viewing direction 105.

To illustrate, in some implementations, the one or more processors 120 adjust the audio scene to compensate for the head orientation 192 of the user 182, and the viewing direction 105 indicates the gaze direction 190 relative to the adjusted audio scene. In an example in which the head orientation data 115 indicates the head orientation 192 in a global coordinate system and the gaze direction data 125 also indicates the gaze direction 190 in the global coordinate system, the direction data generator 104 determines the viewing direction 105 by adjusting the gaze direction 190 to compensate for the head orientation 192 of the user 182 (e.g., by subtracting the head orientation 192 from the gaze direction 190) so that the viewing direction 105 is relative to the adjusted audio scene. In an example in which the gaze direction data 125 indicates the gaze direction 190 in a local coordinate frame of the playback device 180 rather than in global coordinates, the direction data generator 104 sets the viewing direction 105 to match the gaze direction 190. In an example in which the gaze direction data 125 is not available, the direction data generator 104 sets the viewing direction 105 to a default direction (e.g., corresponding to the user looking straight ahead).

Alternatively, the one or more processors 120 may determine the viewing direction 105 relative to the unadjusted audio scene. In an example in which the head orientation data 115 indicates the head orientation 192 in a global coordinate system and the gaze direction data 125 also indicates the gaze direction 190 in the global coordinate system, the direction data generator 104 sets the viewing direction 105 to match the gaze direction 190. In an example in which the gaze direction data 125 indicates the gaze direction 190 in a local coordinate frame of the playback device 180 rather than in global coordinates, the direction data generator 104 determines the viewing direction 105 by adjusting the gaze direction 190 to compensate for the head orientation 192 of the user 182 (e.g., by adding the head orientation 192 to the gaze direction 190) so that the viewing direction 105 is relative to the unadjusted audio scene.

The one or more processors 120 are configured to determine a resolution setting 150 based on a similarity 140 between the viewing direction 105 and the direction of the sound source. For example, the resolution adjuster 108 is configured to compare a direction of the sound source indicated by the metadata 126 (e.g., after adjusting the direction of the sound source to compensate for the head orientation 192) to the viewing direction 105 indicated by the direction data 106. In a particular implementation, the similarity 140 is determined based on a cosine similarity, such as using the expression:

$$S_i = \vec{g} \cdot \vec{v}_i = |\vec{g}| * |\vec{v}_i| * \cos \theta_i,$$

where $S_i$ is the similarity between the viewing direction 105 and the direction of the $i^{th}$ sound source represented in the metadata 126, g is a normalized vector representing the viewing direction 105, $\vec{v}_i$ is a normalized vector representing the direction of the $i^{th}$ sound source represented in the metadata 126, "·" represents a dot product, $|\vec{g}|$ represents a magnitude of $\vec{g}$ (=1), $|\vec{v}_i|$ represents a magnitude of $\vec{v}_i$(=1), $\theta_i$ represents an angle between $\vec{g}$ and $\vec{v}_i$, and "*" represents a multiplication operation. In other implementations, the similarity 140 can be determined based on one or more other techniques, such as a Euclidean distance, a weighted distance, a log distance, an L1 norm, an L2 norm, a technique in which one or more elements of the vectors are weighted, or a combination thereof.

According to an aspect, the resolution adjuster 108 is configured to determine the resolution setting 150 based on the similarity 140 such that that higher similarity (e.g., a sound source that is relatively close to the gaze direction 190) results in higher audio resolution, and lower similarity (e.g., a sound source that is relatively far from the gaze direction 190) results in lower audio resolution. In some implementations, the resolution adjuster 108 compares the similarity 140 to one or more thresholds 142 to determine the resolution setting 150. In an example in which a single threshold 142 is used, the resolution setting 150 has a higher-resolution value for a similarity that is larger than the threshold 142 and has a lower-resolution value for a similarity that is smaller than the threshold 142. In other examples, multiple thresholds 142 may be used to define multiple ranges of similarities that are mapped to respective values of the resolution setting 150. In some implementations, the mapping of similarity values to resolution settings is determined based on one or more equations, one or more distributions, or one or more other techniques.

Figure 3:
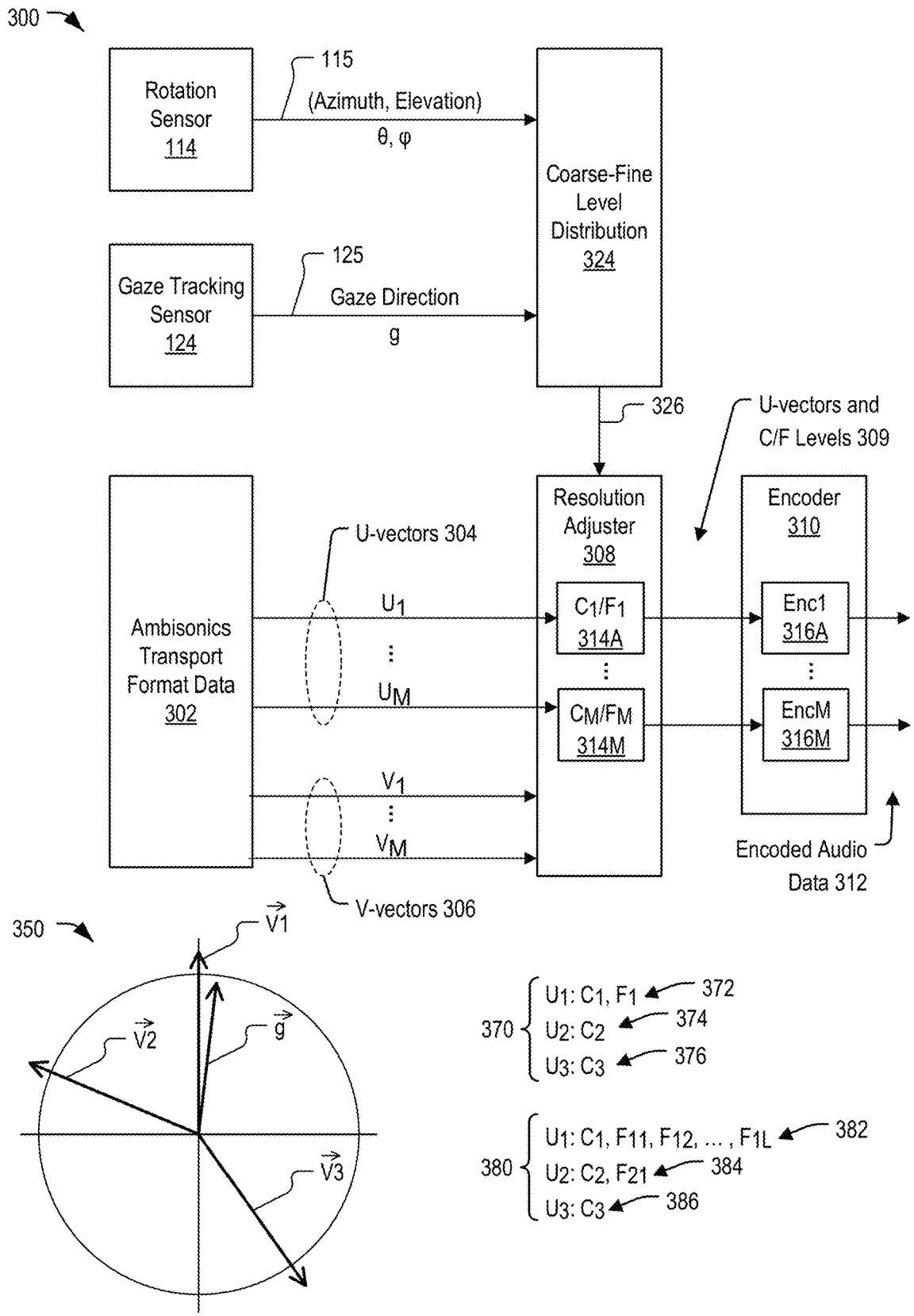
FIG. 3 is a block diagram illustrating a particular implementation of components and operations of a system operable to adjust, based on a viewing direction, a resolution setting associated with audio processing, in accordance with some examples of the present disclosure.
Figure 4:
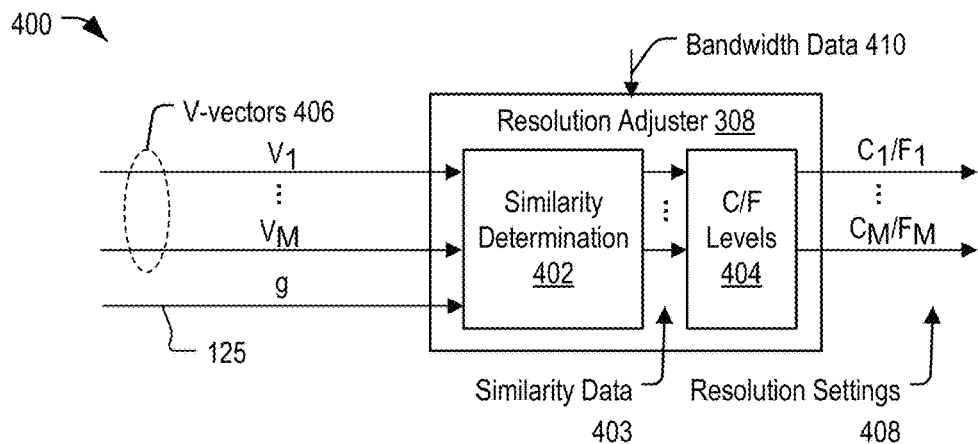
FIG. 4 is a diagram illustrating another implementation of components and operations of a system operable to adjust, based on a viewing direction, a resolution setting associated with audio processing, in accordance with some examples of the present disclosure.

In some implementations, the resolution setting 150 corresponds to a resolution level 152, such as at least one of a coarse resolution level or a fine resolution level, to be applied in the audio processing 144, such as described further with reference to FIG. 3 and FIG. 4. In some implementations, the resolution setting 150 corresponds to a number of bits 154 used in conjunction with processing the audio data 127, an amount of quantization noise 156 associated with processing the audio data 127, or a combination thereof.

The one or more processors 120 are configured to process the audio data 127 based on the resolution setting 150 to generate processed audio data 146. In some examples, the one or more processors 120 include an encoder that performs the audio processing 144. To illustrate, the encoder is configured to encode the audio data 127 based on the resolution setting 150 to generate the processed audio data 146 corresponding to encoded audio data, such as described further with reference to FIG. 3 and FIG. 9B.

In some examples, the one or more processors 120 include a decoder that performs the audio processing 144. In such examples, the audio data 127 corresponds to encoded audio data, and the decoder is configured to decode the encoded audio data based on the resolution setting 150 to generate the processed audio data 146 corresponding to decoded audio data, such as described further with reference to FIGS. 6-8, 9C, and 9E. According to some aspects, the resolution setting 150 indicates a number of resolution levels of the encoded audio data to decode, a number of bits of the encoded audio data to decode, or a combination thereof.

In some examples, the one or more processors 120 include a renderer that performs the audio processing 144. In such examples, the renderer is configured to render the audio data 127 based on the resolution setting 150 to generate the processed audio data 146 corresponding to rendered audio, such as described further with reference to FIGS. 6-8, 9C, and 9D. According to some aspects, the resolution setting 150 indicates an amount of processing resources used to render the audio data 127, or may indicate whether to bypass rendering the audio data 127 based on the similarity 140 being less than a threshold similarity 142 (e.g., rendering of the audio data 127 is bypassed when the resolution setting 150 has a zero value).

The device 102 also includes a modem 170 coupled to the one or more processors 120 and configured to enable communication with one or more other devices, such as the playback device 180. According to some aspects, the modem 170 is configured to receive the audio data 127 from a second device (e.g., audio data that is captured by the microphones 138 of the playback device 180 or streamed from a remote server), receive the direction data 106 (e.g., the gaze direction data 125, the head orientation data 115, or both) from the playback device 180, transmit the processed audio data 146 to the playback device 180, or a combination thereof.

During operation, the one or more processors 120 perform higher-resolution audio processing for one or more sound sources in the audio scene that are closer to the viewing direction 105 than for one or more other sound sources that are further from the viewing direction 105. In the following example, the audio bitstream 148 includes encoded audio data that represents an audio scene, and the audio processing 144 decodes the encoded audio data to be rendered for playback. The audio bitstream 148 includes the audio data 127 and the metadata 126 representing the first sound source 184A, second audio data and second metadata representing the second sound source 184B, and third audio data and third metadata representing the third sound source 184C. The user's gaze direction 190 is forward (e.g., not to the right or left) and elevated above horizontal, and the gaze direction is substantially toward the location of the first sound source 184A. The second sound source 184B is to the left of the user 182 and below the user's eye level, and the third sound source 184C is to the right of, and behind, the user 182 and at approximately the user's eye level.

The one or more gaze tracking sensors 124 detect the gaze direction 190 and generate the gaze direction data 125. The one or more rotation sensors detect the head orientation 192 and generate the head orientation data 115. The playback device 180 transmits the gaze direction data 125 and the head orientation data 115 to the device 102. The one or more processors 120 process the gaze direction data 125 and the head orientation data 115 to obtain the direction data 106 indicating the viewing direction 105 associated with the user 182 of the playback device 180.

The one or more processors 120 also obtain the audio data 127 corresponding to the first sound source 184A and the metadata 126 indicative of a direction of the first sound source 184A, such as from a media file or game engine of the device 102. The resolution adjuster 108 receives the direction data 106 and the metadata 126, adjust the metadata 126 to compensate for the head orientation 192, and determines the resolution setting 150 based on the similarity 140 between the viewing direction 105 and a direction of the first sound source 184A. Because the gaze direction 190 is toward the first sound source 184A, the similarity 140 has a relatively high value, and the resolution setting 150 indicates a relatively high resolution. For example, the resolution setting 150 may indicate a fine resolution level or a relatively large number of bits to represent sound from the sound source 184A. The one or more processors 120 process the audio data 127 based on the resolution setting 150 to generate the processed audio data 146 corresponding to sound from the first sound source 184A. The processed audio data 146 includes a decoded version of the audio data 127 with relatively high resolution.

The one or more processors 120 obtain the second audio data corresponding to the second sound source 184B and the second metadata indicative of a second direction of the second sound source 184B. The viewing direction 105 is more similar to the first direction of the first sound source 184A than to the second direction of the second sound source 184B. The resolution adjuster 108 adjusts the second metadata to compensate for the head orientation 192 and determines a second resolution setting based on a second similarity between the viewing direction 105 and the second direction of the second sound source 184B. Because the second sound source 184B is to the left side of the user 182, the second resolution setting corresponds to a lower resolution for the second audio data than for the audio data 127. For example, the second resolution setting may indicate a medium resolution level or a medium number of bits to represent sound from the second sound source 184B. The one or more processors 120 process the second audio data based on the second resolution setting to generate a decoded version of the second audio data with medium resolution.

The one or more processors 120 obtain the third audio data corresponding to the third sound source 184C and the third metadata indicative of a third direction of the third sound source 184C. The resolution adjuster 108 adjusts the third metadata to compensate for the head orientation 192 and determines a third resolution setting based on a third similarity between the viewing direction 105 and the third direction of the third sound source 184C. Because the third sound source 184C is behind and to the right of the user 182, the third resolution setting corresponds to a lower resolution for the third audio data than for the audio data 127. For example, the third resolution setting may indicate a low resolution level or a relatively small number of bits to represent sound from the third sound source 184C. The one or more processors 120 process the third audio data based on the third resolution setting to generate a decoded version of the third audio data with low resolution.

Processing audio data from sound sources that are farther from the user's gaze direction 190 at lower resolutions as compared to audio data from sound sources that are closer to the user's gaze direction reduces overall use of processing resources, battery power, memory footprint, transmission bandwidth, latency, or combinations thereof, as compared to processing audio data from all sound sources using full resolution. Because the user 182 is likely to focus more attention to sound originating from sound sources in the user's gaze direction 190 than on sound originating from sound sources that are distant from the user's gaze direction 190, the use of lower resolutions may have negligible (or zero), perceivable impact on the overall user experience.

Figure 12:
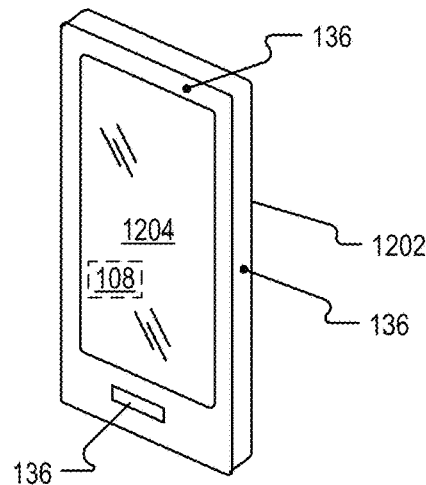
FIG. 12 is a diagram of an implementation of a portable electronic device operable to adjust, based on a viewing direction, a resolution setting associated with audio processing, in accordance with some examples of the present disclosure.
Figure 13:
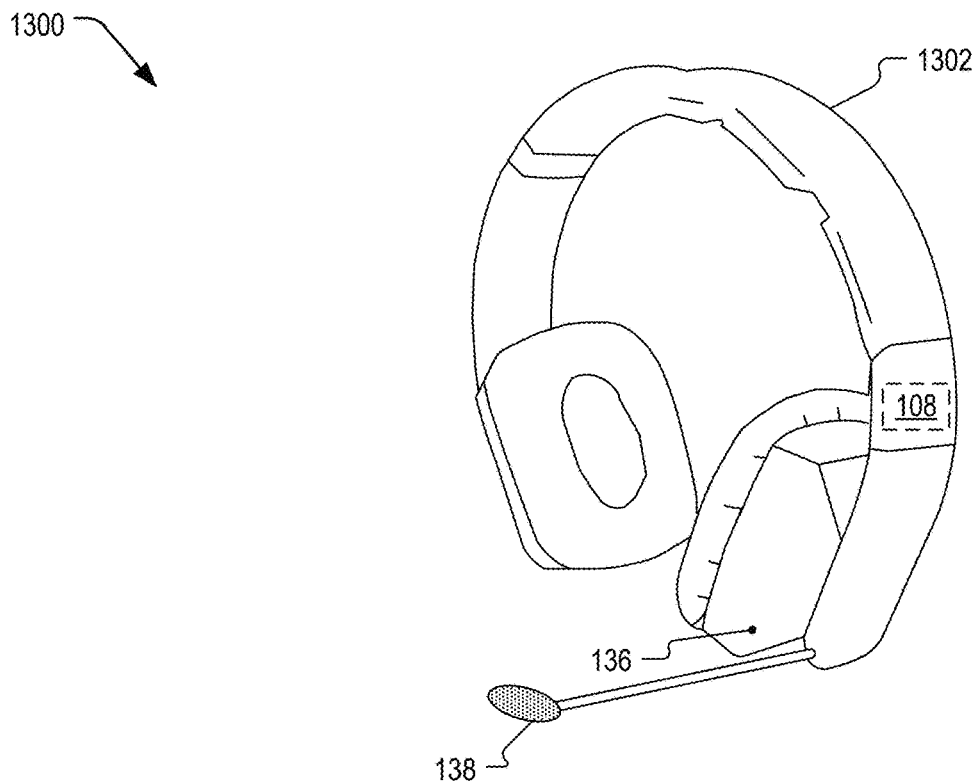
FIG. 13 is a diagram of an implementation of a headset operable to adjust, based on a viewing direction, a resolution setting associated with audio processing, in accordance with some examples of the present disclosure.
Figure 14:
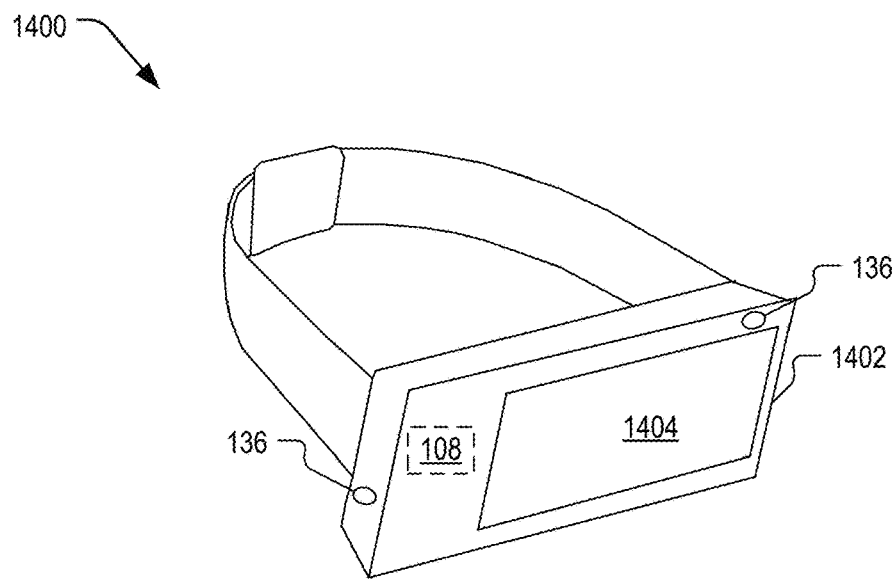
FIG. 14 is a diagram of a wearable electronic device operable to adjust, based on a viewing direction, a resolution setting associated with audio processing, in accordance with some examples of the present disclosure.
Figure 15:
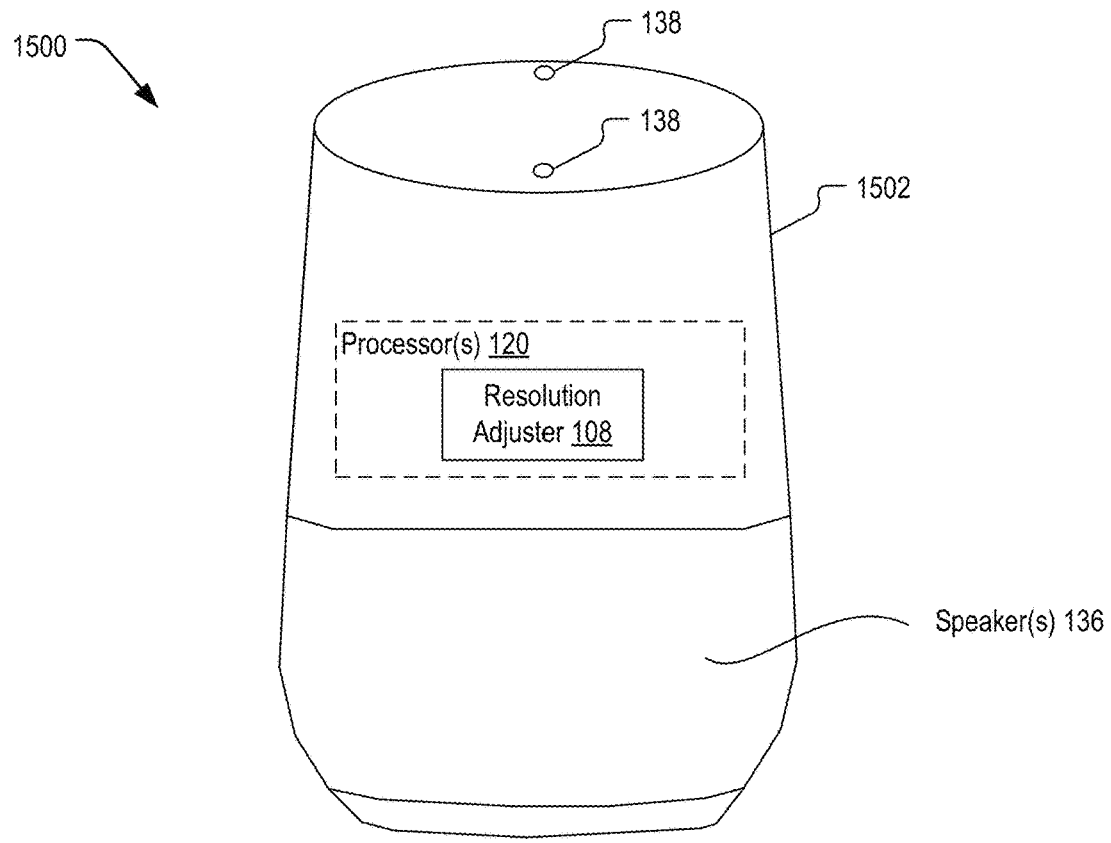
FIG. 15 is a diagram of a voice-controlled speaker system operable to adjust, based on a viewing direction, a resolution setting associated with audio processing, in accordance with some examples of the present disclosure.
Figure 16:
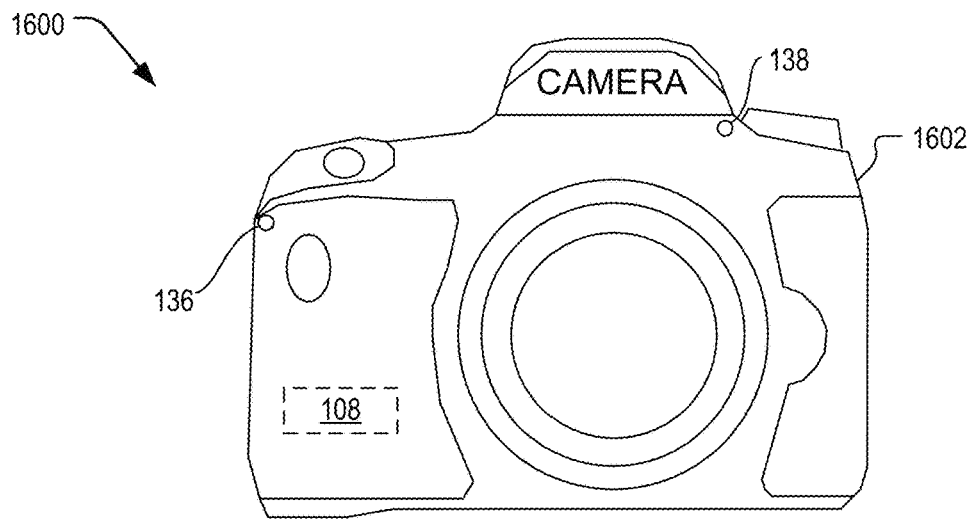
FIG. 16 is a diagram of a camera operable to adjust, based on a viewing direction, a resolution setting associated with audio processing, in accordance with some examples of the present disclosure.
Figure 17:
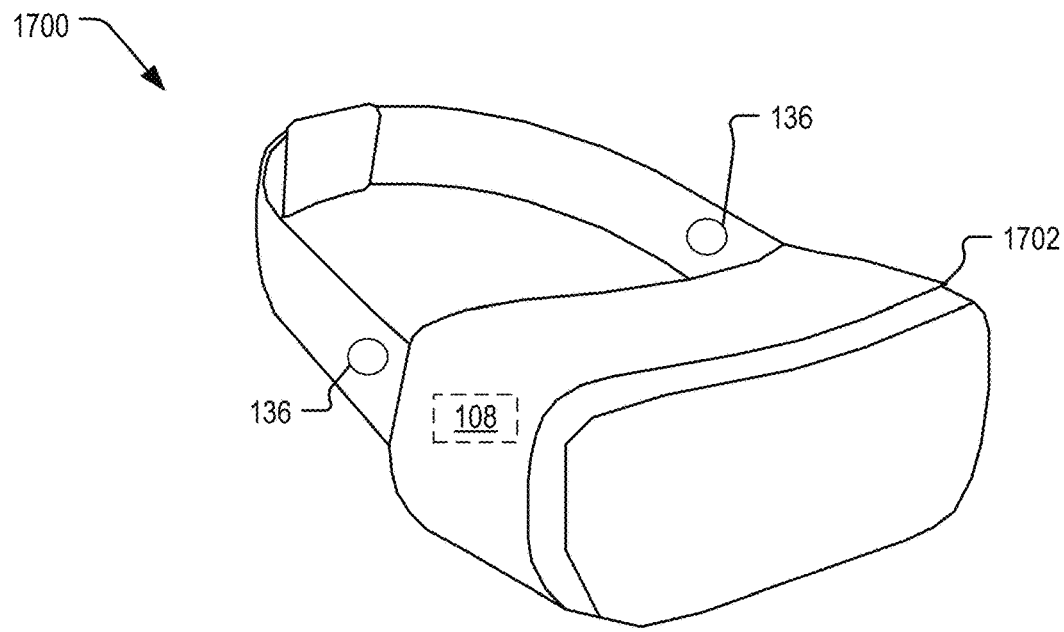
FIG. 17 is a diagram of a headset, such as a virtual reality, mixed reality, or augmented reality headset, operable to adjust, based on a viewing direction, a resolution setting associated with audio processing, in accordance with some examples of the present disclosure.
Figure 18:
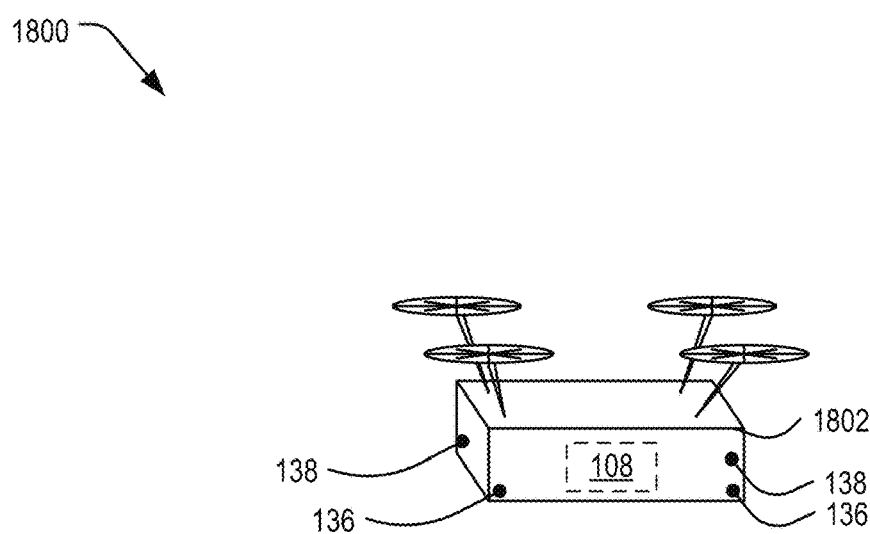
FIG. 18 is a diagram of a first example of a vehicle operable to adjust, based on a viewing direction, a resolution setting associated with audio processing, in accordance with some examples of the present disclosure.
Figure 19:
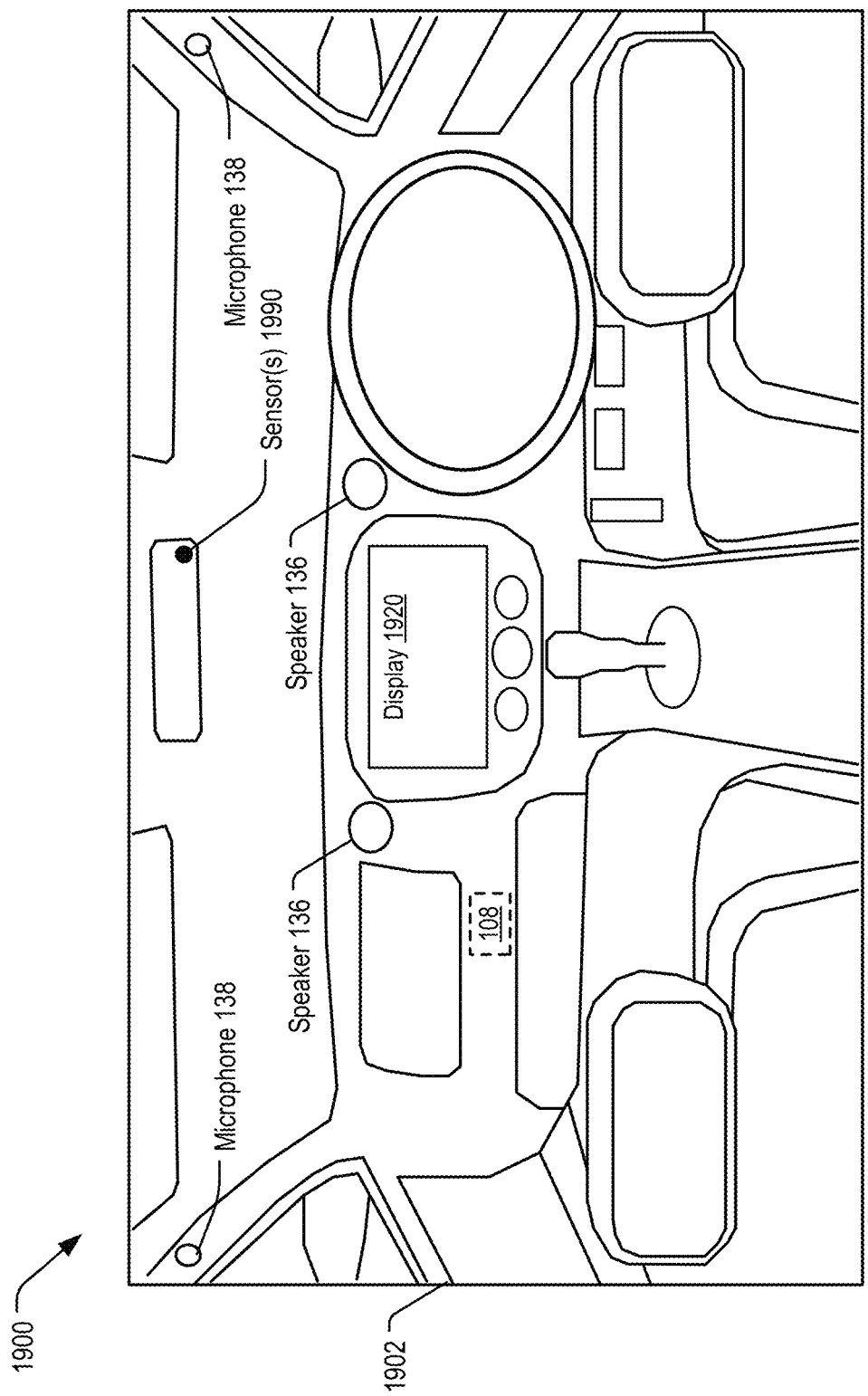
FIG. 19 is a diagram of a second example of a vehicle operable to adjust, based on a viewing direction, a resolution setting associated with audio processing, in accordance with some examples of the present disclosure.

Although the playback device 180 is distinct from the device 102, in other implementations functionality of the device 102 and of the playback device 180 can be performed in a single device, such as described with reference to FIG. 8. According to some aspects, the one or more processors 120 are integrated in at least one of a mobile phone or a tablet computer device, such as illustrated in FIG. 12. According to some aspects, the one or more processors 120 are integrated in a headset device as illustrated in FIG. 13, a wearable electronic device as illustrated in FIG. 14, a voice-controlled speaker system as illustrated in FIG. 15, or a camera device as illustrated in FIG. 16. According to some aspects, the one or more processors 120 are integrated in an extended reality (XR) headset, such as a virtual reality headset, a mixed reality headset, or an augmented reality headset, such as illustrated in FIG. 17, or a vehicle as illustrated in FIG. 18 and FIG. 19.

Although the viewing direction 105 is determined based on both the gaze direction 190 and the head orientation 192, in other implementations the viewing direction 105 is not determined based on both the gaze direction 190 and the head orientation 192. For example, in some implementations, such as when the one or more gaze tracking sensors 124 are omitted, the viewing direction 105 may be determined based on the head orientation 192 (e.g., the viewing direction 105 matches the head orientation 192). In other implementations, such as when the one or more rotation sensors 114 are omitted or when the audio data 127 corresponds to head-locked audio (e.g., audio commentary that always appears in front of the user regardless of where the user's head orientation), the viewing direction 105 may be determined independent of the head orientation 192 (e.g., the viewing direction 105 matches the gaze direction 190). In some implementations, head-locked audio is designated for being processed using a highest available resolution.

Figure 2:
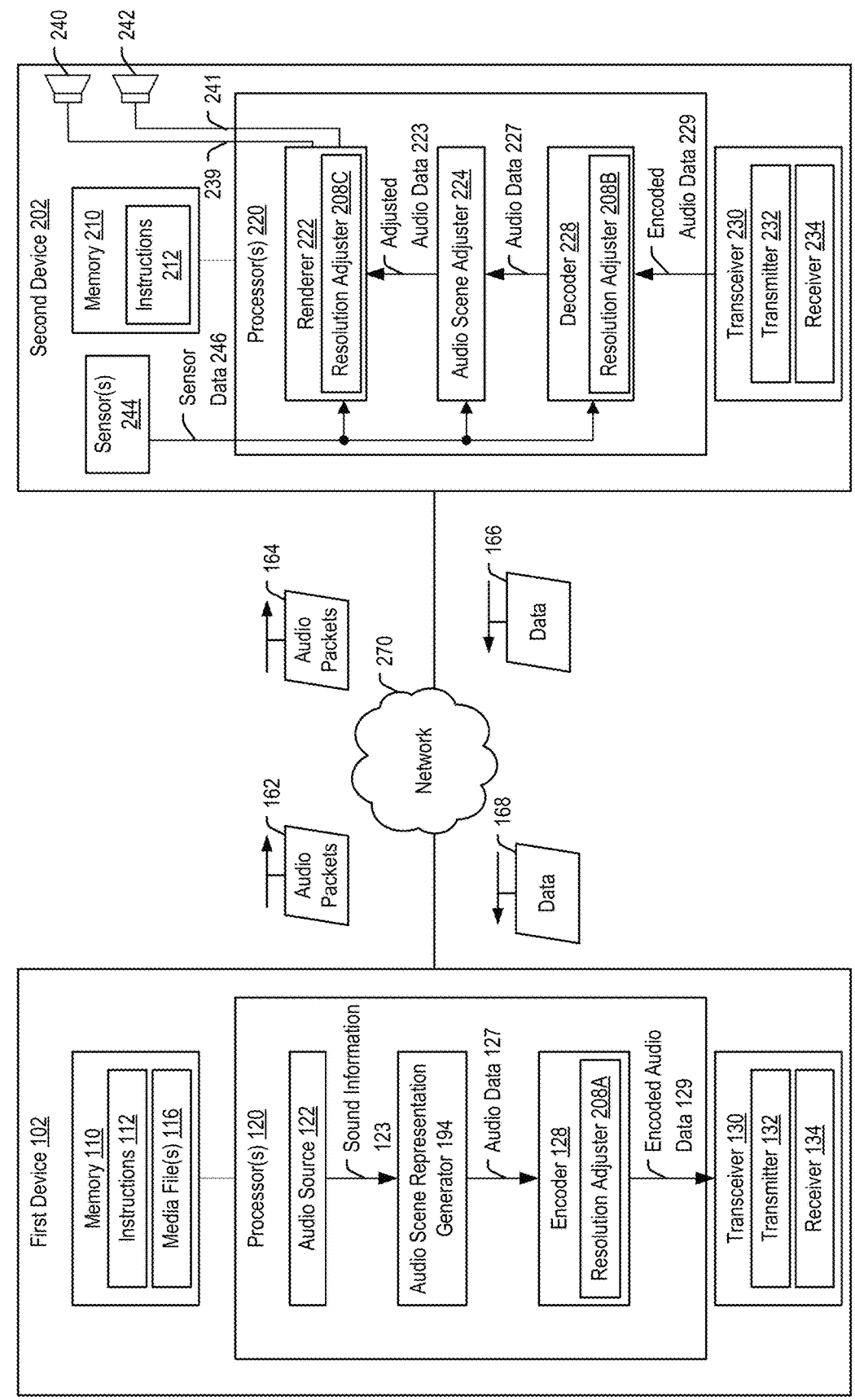
FIG. 2 is a block diagram illustrating another example of an implementation of a system operable to adjust, based on a viewing direction, a resolution setting associated with audio processing, in accordance with some examples of the present disclosure.

Referring to FIG. 2, a particular illustrative aspect of a system configured to adjust, based on a viewing direction, a resolution setting associated with audio processing is depicted and generally designated 200. The system 200 includes a particular implementation of the first device 102 coupled to a second device 202 via a network 270. In a particular implementation, the second device 202 corresponds to the playback device 180. The network 270 may include one or more of a fifth generation (5G) cellular digital network, a Bluetooth® (a registered trademark of BLUETOOTH SIG, INC., Washington) network, an Institute of Electrical and Electronic Engineers (IEEE) 802.11-type network (e.g., WiFi), one or more other wireless networks, or any combination thereof. The first device 102 is configured to generate audio data representative of an audio scene, encode the audio data using adjustable resolution based on a viewing direction of a user of the second device 202, and transmit the audio data to the second device 202 via the network 270. The second device 202 is configured to decode the encoded audio data using adjustable resolution based on the viewing direction of the user, perform one or more adjustments of the audio scene based on movement of the second device 202, render the adjusted audio scene using adjustable resolution based on the viewing direction of the user, and playing out the resulting audio.

The first device 102 includes the memory 110, the one or more processors 120, and a transceiver 130. The memory 110 includes the instructions 112 that are executable by the one or more processors 120. The memory 110 also includes one or more media files 116. The one or more media files 116 are accessible to the processor 120 as a source of sound information, as described further below. In some examples, the one or more processors 120 are integrated in a portable electronic device, such as a smartphone, tablet computer, laptop computer, or other electronic device. In other examples, the one or more processors 120 are integrated in a server, such as an edge server.

The transceiver 130 is coupled to the one or more processors 120 and is configured to enable communication via the network 270 to the second device 202. The transceiver 130 includes a transmitter 132 and a receiver 134. Although the first device 102 is illustrated as including the transceiver 130, in other implementations the first device 102 does not include the transceiver 130 and instead includes the transmitter 132 and the receiver 134 as distinct components.

The one or more processors 120 are configured to execute the instructions 112 to perform operations associated with audio processing. To illustrate, the one or more processors 120 are configured to receive sound information 123 from an audio source 122. For example, the audio source 122 may correspond to a portion of one or more of the media files 116, a game engine, one or more other sources of sound information, or a combination thereof.

The one or more processors 120 are configured to adjust an audio scene associated with the sound information 123 via operation of an audio scene representation generator 194. The audio scene representation generator 194 is configured to output audio data 127 to an encoder 128. In an example, the audio data 127 includes ambisonics data and corresponds to at least one of two-dimensional (2D) audio data that represents a 2D sound field or three-dimensional (3D) audio data that represents a 3D sound field. In some implementations, the audio scene representation generator 194 may obtain one or more representations of an audio scene from a content creator or some other device or source external to the first device 102 (e.g., loaded from a webpage or stored in a file and loaded), and then processed and streamed to the second device 202.

The encoder 128 is configured to encode the audio data 127 to generate encoded audio data 129. In some implementations, the encoder 128 is configured to compress the encoded audio data 129 (e.g., psychoacoustic compression encoding). The encoder 128 may correspond to an AptX encoder, an AAC encoder, or a MP3 encoder, as illustrative, non-limiting examples.

The encoded audio data 129 is output by the one or more processors 120 to the transceiver 130 for transmission to the second device 202. For example, the audio data 127 corresponding to the audio scene may be transmitted as streaming data via one or more first audio packets 162. In some implementations, the audio source 122 corresponds to a portion of a media file (e.g., a portion of the one or more media files 116), and the streaming data is associated with a virtual reality experience that is streamed to the second device 202 (e.g., a playback device) via at least one of a 5G cellular digital network or a Bluetooth® network.

In some implementations, the one or more processors 120 are also configured to receive movement data (e.g., translation data, the gaze direction data 125, the head orientation data 115, or a combination thereof) from a playback device, such as data 166 received from the second device 202. The movement data corresponds to a movement associated with the second device 202 (e.g., movement of the wearer of the second device 202 implemented as a headphone device). As used herein, "movement" includes rotation (e.g., a change in orientation without a change in location, such as a change in roll, tilt, or yaw), translation (e.g., non-rotation movement), or a combination thereof.

The one or more processors 120 are configured to convert the sound information 123 to audio data that represents an audio scene based on the movement associated with the second device 202. To illustrate, the audio scene representation generator 194 adjusts the audio scene to generate updated audio data 127 that represents the adjusted audio scene. For example, in some implementations the audio scene representation generator 194 performs translation, rotation, or both, on objects prior to converting to ambisonics, and in some implementations the audio scene representation generator 194 performs translation operations, rotation operations, or both, to apply the translation, rotation, or both to ambisonics representing an existing sound field.

The encoder 128 includes a resolution adjuster 208A that corresponds to the resolution adjuster 108 of FIG. 1. The resolution adjuster 208A is configured to determine a resolution setting based on a comparison of a viewing direction (e.g., the viewing direction 105 of FIG. 1) and a direction of one or more sound sources of the updated audio data 127 (e.g., based on the metadata 126 of FIG. 1). For example, the one or more processors 120 may determine the viewing direction associated with the user of the second device 202 based on data 166, and the resolution adjuster 208 may determine resolution settings for one or more sound sources represented in the audio data 127 based on a similarity between the viewing direction and the direction of each of the sound sources. Audio data associated with sound sources that are in the user's peripheral vision or outside the user's field of view is encoded with reduced resolution (e.g., using fewer bits, less power, and reduced encoding latency) as compared to audio data associated with sound sources that are in the center of the user's vision. The one or more processors 120 are configured to send the encoded audio data as streaming data, via wireless transmission, to the second device 202, such as via second audio packets 164.

The first device 102 is configured to receive subsequent movement data, such as data 168 that is received after receiving the data 166, and may perform further adjustments to the audio scene and to the resolution(s) used by the encoder 128 to account for movement of the second device 202, including changes in head orientation, gaze direction, or both, of the user of the second device 202. Thus, the first device 102 can receive a stream of movement information indicating changes in the location, orientation, and user gaze direction associated with the second device 202 and update the streaming audio data transmitted to the second device 202 to represent an adjusted version of the audio scene that corresponds to the changing location, orientation, and user gaze direction associated with the second device 202. However, in some implementations, the first device 102 does not perform rotations of the audio scene responsive to changes in orientation of the second device 202, and instead rotations of the audio scene are performed at the second device 202.

The second device 202 includes one or more processors 220 coupled to a memory 210, a transceiver 230, one or more sensors 244, a first loudspeaker 240, and a second loudspeaker 242. In an illustrative example, the second device 202 corresponds to a wearable device. To illustrate, the one or more processors 220, the memory 210, the transceiver 230, the one or more sensors 244, and the loudspeakers 240, 242 may be integrated in a headphone device in which the first loudspeaker 240 is configured to be positioned proximate to a first ear of a user while the headphone device is worn by the user, and the second loudspeaker 242 is configured to be positioned proximate to a second ear of the user while the headphone device is worn by the user.

The memory 210 is configured to store instructions 212 that are executable by the one or more processors 220. The one or more sensors 244 are configured to generate sensor data 246 indicative of a movement of the second device 202, a pose of the second device 202, a gaze direction of a user of the second device 202, or a combination thereof. In a particular implementation, the one or more sensors include the one or more gaze tracking sensors 124 and the one or more rotation sensors 114 of FIG. 1.

The transceiver 230 includes a wireless receiver 234 and a wireless transmitter 232. The wireless receiver 234 is configured to receive the encoded audio data 129 from the first device 102 via the wireless transmission and to output corresponding to encoded audio data 229 to the one or more processors 220. In some implementations, the encoded audio data 229 matches the encoded audio data 129, while in other implementations the encoded audio data 229 may differ from the encoded audio data 129 due to one or more audio packets being lost during transmission, one or more bit errors occurring in a received audio packet, or one or more other causes of data loss. Any such data losses may be corrected (e.g., via forward error correction encoding or redundant information transmission) or may be compensated for (e.g., via interpolation between received packets to estimate audio data for a lost packet). Although the second device 202 is illustrated as including the transceiver 230, in other implementations the second device 202 may omit the transceiver 230 and may include the receiver 234 and the transmitter 232 as distinct components.

The one or more processors 220 are configured to receive, via wireless transmission, the encoded audio data 229 representing the audio scene. For example, the encoded audio data 229 may include the metadata 126 and an encoded version of the audio data 127 of FIG. 1. In some implementations, the one or more processors 220 are configured to receive the encoded audio data 229 as streaming data from a streaming device (e.g., via the first audio packets 162 from the first device 102).

The one or more processors 220 are configured to decode the encoded audio data 229. For example, a decoder 228 is configured to process the encoded audio data 229 to generate audio data 227 that corresponds to the audio data 127 at the first device 102 and is indicative of an audio scene that corresponds to the audio scene representation generated at the first device 102. In some implementations, the audio data 227 includes ambisonics data and corresponds to at least one of two-dimensional (2D) audio data or three-dimensional (3D) audio data. The decoder 228 includes a resolution adjuster 208B that corresponds to the resolution adjuster 108 of FIG. 1. The resolution adjuster 208B determines, based on a similarity between a viewing direction of a user of the second device 202 and a direction of a sound source, a decoding resolution for that sound source. To illustrate, the one or more processors 220 may process the sensor data 246 to determine the viewing direction 105 as described with respect to the one or more processors 120 of FIG. 1. Audio data associated with sound sources that are in the user's peripheral vision or outside the user's field of view may be decoded to have reduced resolution (e.g., using fewer bits, less power, and reduced decoding latency) as compared to audio data associated with sound sources that are in the center of the user's vision.

The one or more processors 220 are configured to adjust the audio data 227 to alter the audio scene based on data associated with at least one of a translation or an orientation associated with movement of the second device 202, such as indicated by the sensor data 246. To illustrate, the audio scene adjuster 224 is configured to adjust the audio data 227 to alter the audio scene based on the sensor data 246 indicating a change in orientation or translation of the second device 202. In one example, the one or more processors 220 are configured to adjust the audio data 227 to rotate the audio scene responsive to the sensor data 246 indicating a change of the orientation. In another example, the one or more processors 220 are configured to translate and rotate the audio scene responsive to the movement of the second device 202 and without sending translation data associated with the movement of the second device 202 to a streaming device (e.g., without sending the data 166, 168 to the first device 102). In one example, the one or more processors 120 are configured to perform one of a translation or a rotation of the audio scene based on translation data (e.g., the data 166, 168) received from the second device 202, and the processors 220 are configured to perform the other of the translation or the rotation of the audio scene based on the sensor data 246.

The one or more processors 220 are configured to render the adjusted decompressed audio data 223 into two or more loudspeaker gains to drive two or more loudspeakers. For example, a renderer 222 includes a resolution adjuster 208C that corresponds to the resolution adjuster 108 of FIG. 1. The resolution adjuster 208C determines, based on a similarity between a viewing direction of a user of the second device 202 and a direction of a sound source, a rendering resolution for that sound source. Audio data associated with sound sources that are in the user's peripheral vision or outside the user's field of view may be rendered with reduced resolution (e.g., using fewer bits, less power, and reduced latency) as compared to audio data associated with sound sources that are in the center of the user's vision. A first loudspeaker gain is generated to drive the first loudspeaker 240 and a second loudspeaker gain is generated to drive the second loudspeaker 242. To illustrate, the one or more processors 220 are configured to perform binauralization of the adjusted decompressed audio data 223, such as using one or more HRTFs or BRIRs to generate the loudspeaker gains, and output the adjusted decompressed audio data as pose-adjusted binaural audio signals 239, 241 to the loudspeakers 240, 242 for playback.

The first device 102 and the second device 202 may each perform operations that, when combined, correspond to a split audio rendering operation. The first device 102 processes the sound information 123 from the audio source 122 and generates audio data 127, such as 2D or 3D ambisonics data, representing the audio scene. In some implementations, the first device 102 also performs translations to the audio scene prior to sending the encoded audio data 129 to the second device 202. In some implementations, the second device 202 adjusts the audio data 227 to alter the audio scene based on the orientation of the second device 202 and renders the resulting adjusted audio data 223 for playout. In some implementations, the second device 202 also performs translations to the audio scene. Examples of various operations that may be performed by the first device 102 or the second device 202, or both, and components that may be incorporated in the first device 102 or the second device 202, or both, are described in further detail with reference to FIGS. 3-10.

Thus, the first device 102 may operate as a streaming source device and the second device 202 may operate as a streaming client device. By performing audio processing operations such as encoding, decoding, and rendering, with adjustable resolution so that audio data from sound sources that are farther from the user's gaze direction 190 are processed at lower resolutions as compared to audio data from sound sources that are closer to the user's gaze direction reduces overall use of processing resources, battery power, memory footprint, transmission bandwidth, latency, or combinations thereof, as compared to processing audio data from all sound sources using full resolution. Because the user of the second device 202 is likely to focus more attention to sound originating from sound sources in the user's gaze direction than on sound originating from sound sources that are distant from the user's gaze direction, the use of lower resolutions may have negligible, or zero, perceivable impact on the overall user experience.

Although the first device 102 includes the resolution adjuster 208A in the encoder 128 and the second device 202 includes the resolution adjuster 208B in the decoder 228 and the resolution adjuster 208C in the renderer 222, in other implementations one or more of the resolution adjusters 208A, 208B, or 208C may be omitted. To illustrate, since each of the resolution adjusters 208A, 208B, and 208C provides benefits such as reduced use of processing resources, power consumption, latency, etc., independently of the other resolution adjusters 208A, 208B, and 208C, the system 200 may have improved performance using any one or any two of the resolution adjusters 208A, 208B, or 208C as compared to a system that uses full resolution for all audio data processing.

Referring to FIG. 3, a diagram 300 depicts a particular illustrative aspect of components and operations that may be included in a system configured to adjust, based on a viewing direction, a resolution setting associated with audio processing, such as the system 100 of FIG. 1, and a diagram 350 graphically depicts an example of a viewing direction and directions of multiple audio sources.

The diagram 300 illustrates the rotation sensor 114, the gaze tracking sensor 124, a coarse-fine level distribution 324, a resolution adjuster 308 configured to receive ambisonics transport format data 302, and an encoder 310 coupled to the resolution adjuster 308. The ambisonics transport format data 302 includes a representation of ambisonics data in which multiple ambisonics channels are represented as U-vector, V-vector pairs.

For example, the ambisonics transport format data 302 includes, for each particular sound source of multiple sound sources: a U-vector, of multiple U-vectors 304 in the ambisonics transport format data 302, that corresponds to a sound energy from that particular sound source; and a V-vector, of multiple V-vectors 306 in the ambisonics transport format data 302, that corresponds to a direction of that particular sound source. To illustrate, $U_1$ corresponds to a vector of samples indicating sound energy of a first sound source, and $V_1$ corresponds to a direction of the first sound source. Similarly, $U_M$ corresponds to a vector of samples indicating sound energy of an $M^{th}$ sound source, and $V_M$ corresponds to a direction of the $M^{th}$ sound source (where M is an integer greater than one). Thus the audio data 127 and the metadata 126 of FIG. 1 may be included in the ambisonics transport format data 302, such that the audio data 127 is included in a particular U-vector of the multiple U-vectors 304 and the metadata 126 is included in a particular V-vector of the multiple V-vectors 306. According to an aspect, the ambisonics transport format data 302 corresponds to a Higher Order Ambisonics (HOA) Transport Format (HTF), and the U-vectors 304 and the V-vectors 306 are generated as a result of performing a singular value decomposition on a set of samples of ambisonics data.

The head orientation data 115 from the rotation sensor 114 (e.g., including an azimuth angle "θ" and an elevation angle "φ") and the gaze direction data 125 (e.g., including the gaze direction "g") are used in conjunction with a coarse-fine level distribution 324. In an example, the coarse-fine level distribution 324 indicates ranges of similarity values, such as the similarity 140 of FIG. 1, between a viewing direction and a V-vector. Similarity values within a first range correspond to a coarse resolution level, and similarity values within a second range correspond to a fine resolution level. In some implementations, distribution data 326 that indicates the ranges of similarity values, or ranges of values of the V-vectors 306 that correspond to the coarse resolution level and the fine resolution level, is provided to the resolution adjuster 308.

The resolution adjuster 308 is configured to determine, for each of the sound sources, a resolution level to be used to quantize the energy of that sound source. For example, a first resolution level 314A indicates a resolution level for encoding $U_1$ based on a vector similarity of $V_1$ and the viewing direction. An $M^{th}$ resolution level 314M indicates a resolution level for encoding $U_M$ based on a vector similarity of $V_M$ and the viewing direction.

The encoder 310 is configured to receive input data 309 including the U-vectors 304 and coarse/fine resolution level indicators for each of the U-vectors 304. The encoder 310 includes multiple individual encoders configured to operate in parallel to encode the U-vectors 304, such as first encoder (Enc1) 316A configured to encode $U_1$ and an $M^{th}$ encoder (EncM) 316M configured to encode $U_M$. The encoded U-vectors are included in encoded audio data 312 that is output by the encoder 310.

Referring to the diagram 350, a vector $\vec{g}$ represents the viewing direction of a user at the origin of a polar coordinate system, a vector $\vec{V1}$ corresponds to $V_1$ and represents a direction of a first sound source in the ambisonics transport format data 302, a vector $\vec{V2}$ corresponds to $V_2$ and represents a direction of a second sound source in the ambisonics transport format data 302, and a vector $\vec{V3}$ corresponds to $V_3$ and represents a direction of a third sound source in the ambisonics transport format data 302. As illustrated, $\vec{V1}$ is most similar to g and $\vec{V3}$ is least similar to $\vec{g}$. In a particular implementation, the first sound source in the ambisonics transport format data 302 corresponds to the first sound source 184A of FIG. 1, the second sound source in the ambisonics transport format data 302 corresponds to the second sound source 184B of FIG. 1, and the third sound source in the ambisonics transport format data 302 corresponds to the third sound source 184C of FIG. 1. In a particular implementation, $\vec{V1}$, $\vec{V2}$, and $\vec{V3}$ have been adjusted to compensate for the head orientation detected by the rotation sensor 114, and $\vec{g}$ corresponds to the gaze direction detected by the gaze tracking sensor 124.

A first example 370 of resolution levels indicates that a resolution level 372 for $U_1$ includes the coarse resolution level $C_1$ and the fine resolution level $F_1$. A resolution level 374 for $U_2$ includes only the coarse resolution level $C_2$, and a resolution level 376 for $U_3$ includes only the coarse resolution level $C_3$. In some implementations, the coarse resolution level and the fine resolution level are the same for all sound sources (e.g., the coarse resolution levels $C_1$, $C_2$, and $C_3$ are the same), while in other implementations resolution levels may vary between the sound sources (e.g., $C_1$ may have higher resolution (e.g., be represented by more bits) than $C_2$).

In some implementations, the fine resolution level incudes one or more of multiple fine resolution sub-levels. A second example 380 of resolution levels indicates that a resolution level 382 for $U_1$ includes the coarse resolution level $C_1$ and multiple non-zero fine resolution levels $F_{11}$, $F_{12}$, ..., $F_{1L}$ (where L is an integer greater than 2). A resolution level 384 for $U_2$ includes the coarse resolution level $C_2$, and a non-zero fine resolution level $F_{21}$, and a resolution level 386 for $U_3$ includes only the coarse resolution level $C_3$.

Examples of techniques that can be used to determine similarity measures were described above with reference to FIG. 1. Additional equations are provided below to illustrate various additional techniques that can be used to calculate a similarity measure ($S_i$) for implementations in which the audio is in an ambisonic representation. In the below equations, T and X are two Ambisonics signals for which similarity is to be quantified, E is equal to the expectation value, K is equal to the max number of ambisonic coefficients for a given order, i is the gaze frame number, and c is the coefficient number that ranges between 1 and K. In an implementation, for a 4th order ambisonics signal, the total number of ambisonics coefficients (K) is 25.

One way is to implement the similarity measure S, as a correlation as follows:

for k=1:K {$S_i(k)$=E[$T_i(c)X(c+k)$]/(sqrt(E[$T_i(k)]^2$)sqrt(E[X(k)$]^2$]), where comparing all of the $i^{th}$ $S_i(k)$'s yields the maximum similarity value.

Another way to implement $S_i$, uses a time-domain least squares fit as follows:

for k=1:K {$S_i(k)$={frame=0gaze_frames||$T_i(c)-X(c+k)||^2$} where comparing all of the $i^{th}$ $S_i(k)$'s yields the maximum similarity value. The notation "frame=Ogaze_frames" denotes summation from i=0 to i=1, where I is the total number of gaze frames. Note that instead of using the expectation value as shown above, another way to represent the expectation is to include using at least an express summation over at least the number of frames (eyegaze_frames) that make up how long the eye gaze is held.

Another way to implement $S_i$, uses a fast Fourier transform (FFT) in conjunction with the frequency domain is as follows:

for k=1:K {$S_i(k)$={frame=0eyegaze_frames f=1f_frame||$T_i(f)-X(f)exp(j\omega k)||^2$}, where comparing all of the $i^{th}$ $S_i(k)$'s yields the maximum similarity value. Note that there is an additional summation over the different frequencies (f=1 ... f_frame) used in the FFT.

Another way is to implement $S_i$, uses an Itakura-Saito distance as follows:

for k=1:K {$S_i(k)$={frame=0eyegze_frames f=1f_frame||$T_i(f)/X(f)exp(-j\omega k)-log[T_i(f)/X(f)exp(-(-j\omega k)]^{-1}$||}, where comparing all of the $i^{th}$ $S_i(k)$'s yields the maximum similarity value.

Another way to implement S, is based on a square difference measure as follows:

for k=1:K {$S_i(k)$={frame=0eyegaze_frames($T_i(k)-X(k))^2$} where comparing all of the $i^{th}$ $S_i(k)$'s yields the maximum similarity value.

Referring to FIG. 4, a particular illustrative aspect of a resolution adjuster 308 that may be included in a system configured to adjust, based on a viewing direction, a resolution setting associated with audio processing is depicted and generally designated 400. In a particular implementation, the resolution adjuster 308 corresponds to one or more of the resolution adjuster 308A, the resolution adjuster 308B, or the resolution adjuster 308C of FIG. 3.

The resolution adjuster 308 is configured to receive the gaze direction data 125, bandwidth data 410, and V-vectors 406 corresponding to multiple sound sources of ambisonic transport format data. The V-vectors 406 include $V_1$ corresponding to a first sound source and one or more other V-vectors including $V_M$ corresponding to an $M^{th}$ sound source. In a particular implementation, the V-vectors 406 correspond to the V-vectors 306 of FIG. 3. The resolution adjuster 308 performs a similarity determination operation 402 that determines a similarity of each of the V-vectors 406 to the gaze direction indicated by the gaze direction data 125 and outputs similarity data 403 that indicates each of the determined similarities.

The resolution adjuster 308 processes the similarity data 403 to determine resolution levels 404 based on the bandwidth data 410. For example, depending on available bandwidth and bandwidth quality (e.g., for transmitting energy quantization bits of an encoded version of ambisonic transport format data to a playback device), the resolution adjuster 308 can increase or decrease ranges of similarity values, precision, or both, that correspond to coarse and fine resolution levels (and, in some implementations, fine resolution sub-levels), such as by adjusting the coarse-fine level distribution 324 of FIG. 3. The resulting resolution levels 404 include, for each of the M sound sources, a resolution level for that sound source, such as the resolution levels 314A-314M of FIG. 3. The resolution adjuster 308 outputs the resolution levels 404 as a set of resolution settings 408.

By adaptively adjusting the coarse and fine resolution levels based on the bandwidth data 410, the resolution adjuster 308 may improve (e.g., substantially maximize) an overall audio resolution of a sound scene that is perceivable to a user during playback in light of varying bandwidth resources.

Figure 5:
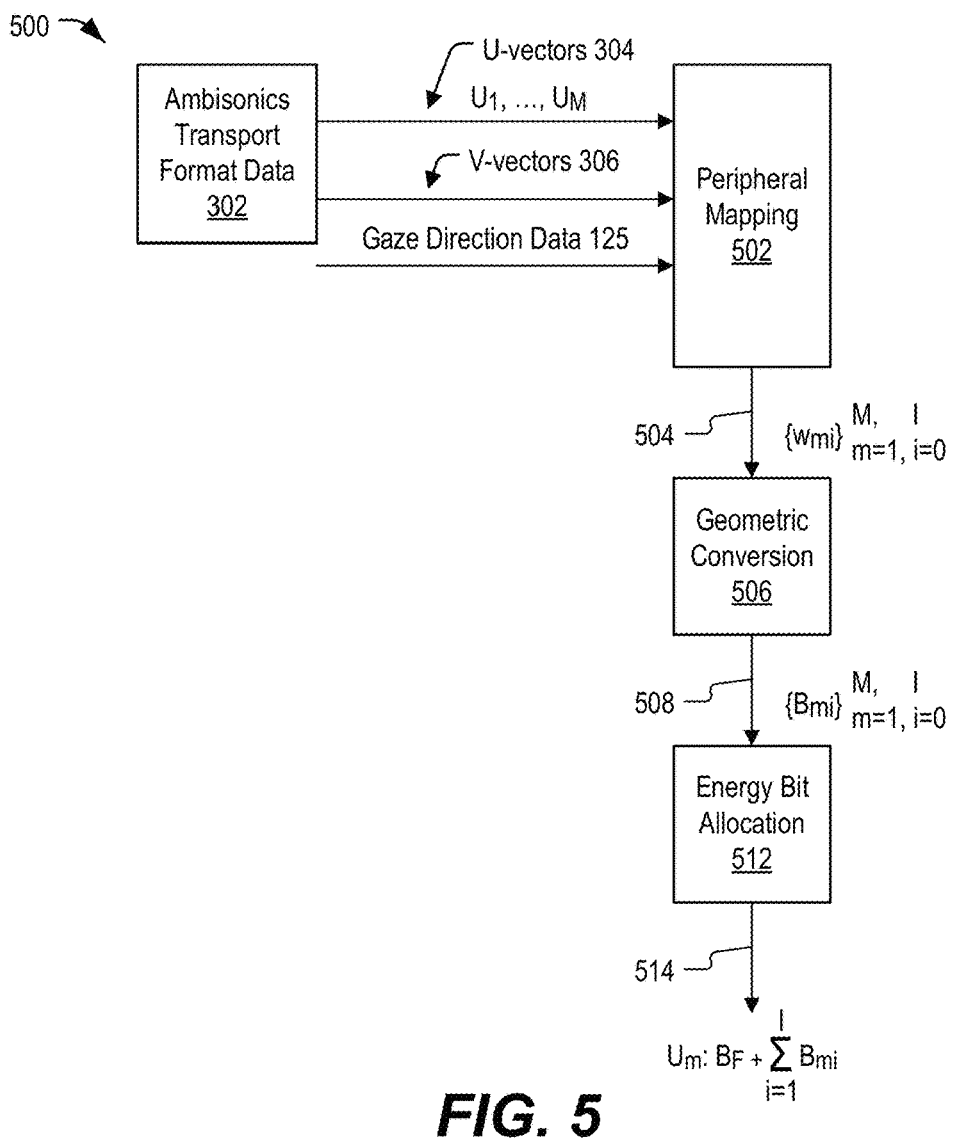
FIG. 5 is a diagram illustrating another implementation of components and operations of a system operable to adjust, based on a viewing direction, a resolution setting associated with audio processing, in accordance with some examples of the present disclosure.

Referring to FIG. 5, a particular illustrative aspect of operations that may be performed in a system operable to adjust, based on a viewing direction, resolution settings associated with audio processing is depicted and generally designated 500. As illustrated, the resolution settings are provided based on gaze direction data 125 and the U-vectors 304 and V-vectors 306 of the ambisonics transport format data 302 of FIG. 3.

A peripheral mapping operation 502 is performed based on the V-vectors 306 and the gaze direction data 125 to map each of the V-vectors 306 to a particular vision region of the user of the device. For example, the peripheral mapping operation 502 may be configured to categorize each of the M sound sources represented by the U-vectors 304 and the V-vectors 306 to a respective one of a set of regions based on peripheral vision of the human eye, such as (in order from highest similarity to the gaze direction to lowest similarity to the gaze direction): a central region, a paracentral region, a near-peripheral region, a mid-peripheral region, and a far-peripheral region, as an illustrative, non-limiting example.

The peripheral mapping operation 502 generates an output 504 that indicates a visual resolution for each of the M sound sources. For example, the output 504 can be represented as a matrix $$\{w_{mi}\}_{m=1}^{M}{}_{i=0}^{I}$$

having M rows and I+1 columns, where each row corresponds to a respective one of the M sound sources, and where column 0 corresponds to a lowest resolution level (e.g., coarse resolution level) and column I corresponds to a highest resolution level (e.g., a highest fine resolution sub-level). To illustrate, each row can represent a probabilistic vector that determines visual resolution for the sound source corresponding to that row.

A geometric conversion 506 is performed to generate an output 508 indicating bits corresponding to each of the resolution levels for each of the sound sources. For example, the output 508 can be represented as a matrix $$\{B_{mi}\}_{m=1}^{M}{}_{i=0}^{I}$$

having M rows and I+1 columns, where each row corresponds to a respective one of the M sound sources, and where column 0 corresponds to a lowest resolution level (e.g., coarse resolution level), column I corresponds to a highest resolution level (e.g., a highest fine resolution sub-level), and $B_{mi}$ indicates a number of bits for energy quantization corresponding to the $i^{th}$ resolution level for the $m^{th}$ sound source.

An energy bit allocation 512 determines a total bit allocation 514 for energy quantization for each of the sound sources. For example, a total bit allocation for energy quantization of the U-vector for the $m^{th}$ sound source ($U_m$) is given by:

$$B_F + \Sigma_{i=1}^{I} B_{mi},$$

where $B_F$ represents a number of bits allocated to a minimum resolution category (e.g., a number of bits for a sound source in a far-peripheral region), which may correspond to a coarse resolution level, and $\Sigma_{i=1}^{I} B_{mi}$, represents the sum of the bits that are allocated to $U_m$ for each of the I fine resolution sub-levels.

Figure 6:
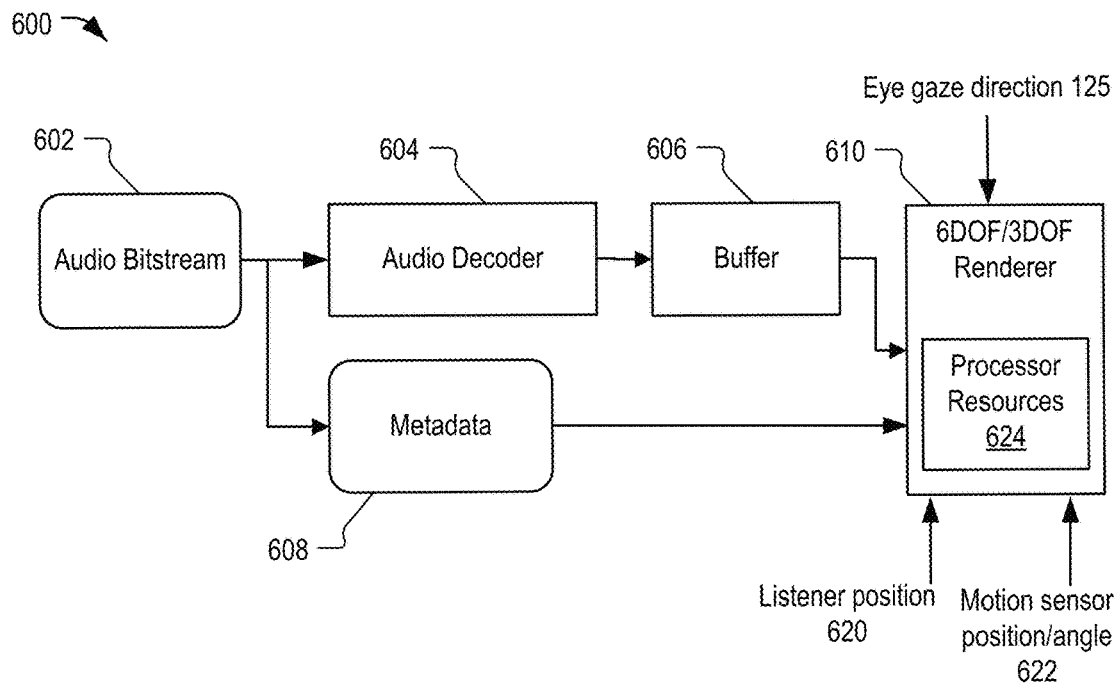
FIG. 6 is a diagram illustrating another implementation of components and operations of a system operable to adjust, based on a viewing direction, a resolution setting associated with audio processing, in accordance with some examples of the present disclosure.

Referring to FIG. 6, a particular illustrative aspect of components that may be included in a system operable to adjust, based on a viewing direction, a resolution setting associated with audio processing is depicted and generally designated 600. An audio decoder 604 is configured to decode an audio bitstream 602. In some implementations, the audio decoder 604 corresponds to a conventional audio decoder that is configured to decode audio data from the audio bitstream and to send the decoded audio data to a buffer 606.

A renderer 610 is configured to render an audio scene, using three degrees of freedom (3DOF) or six degrees of freedom (6DOF), based on the decoded audio data from the buffer 606 and metadata 608 of the audio bitstream 602 that indicates a direction of each sound source corresponding to the decoded audio data. The renderer 610 is configured to adjust the directions of the sound sources indicated in the metadata to compensate for a motion sensor position/angle 622. For example, the motion sensor position/angle 622 may correspond to the head orientation data 115 of FIG. 1. In some implementations, the renderer 610 is further configured to adjust the sound scene to compensate for a listener position 620 (e.g., a translational movement of the user 182 of FIG. 1).

The renderer 610 is configured to allocate, for each of the sound sources, an amount of processor resources 624 for rendering audio corresponding to that sound source based on the similarity between the direction of that sound source (e.g., after compensating the metadata 608 based on head orientation indicated by the motion sensor position/angle 622) to the eye gaze direction indicated by the eye gaze direction data 125. The processor resources 624 can include a bit allocation that affects an amount of precision used in arithmetic operations, a number of bits used for data representation, or particular processor cores on which computations are performed, as illustrative non-limiting examples. In an illustrative implementation, the renderer 610 includes the resolution adjuster 108 of FIG. 1 that generates the resolution setting 150 for each sound source indicating an amount of processing resources used to render the audio data of that sound source. To illustrate, more processor resources may be allocated to perform higher-quality (e.g., higher-resolution) rendering for sound sources closer to the center of the listener's gaze and fewer processing resources may be allocated to perform lower-quality (e.g., lower-resolution) rendering for sound sources farther from the center of the listener's gaze.

Figure 7:
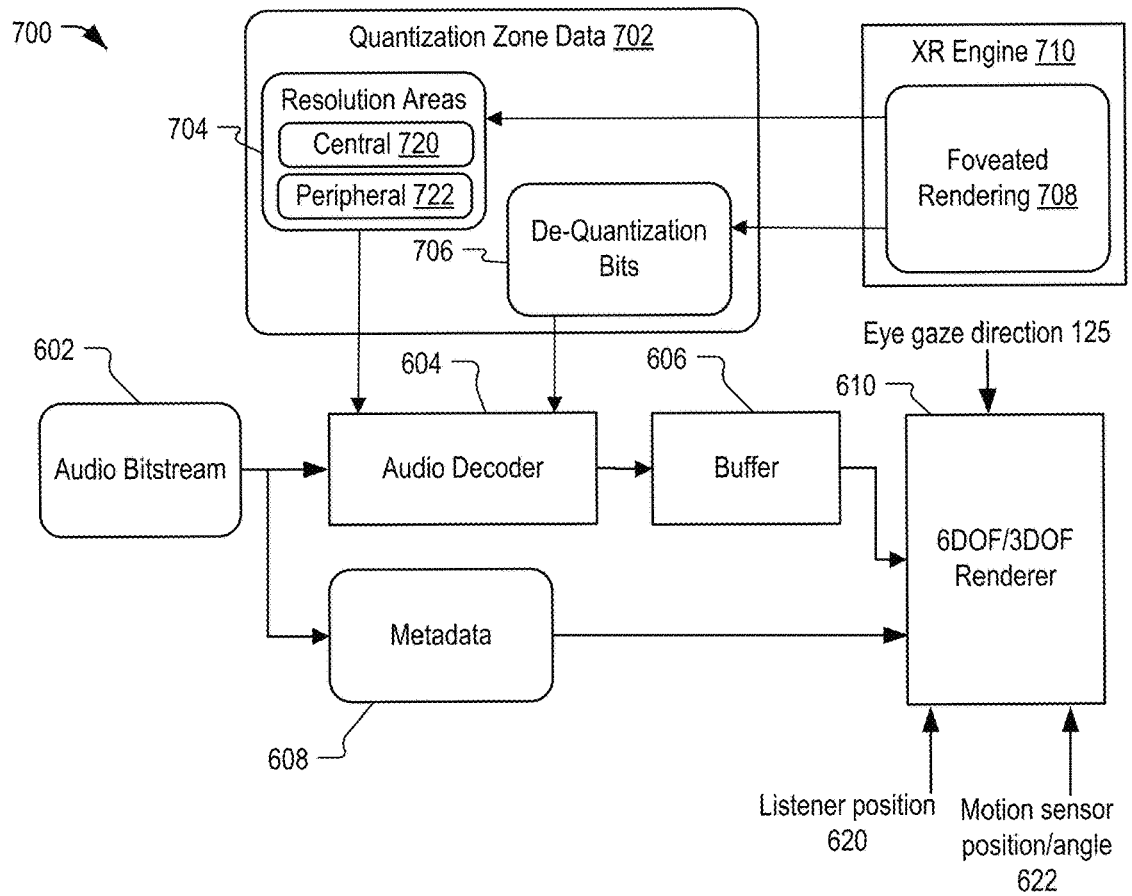
FIG. 7 is a diagram illustrating another implementation of components and operations of a system operable to adjust, based on a viewing direction, a resolution setting associated with audio processing, in accordance with some examples of the present disclosure.

Referring to FIG. 7, a particular illustrative aspect of components that may be included in a system operable to adjust, based on a viewing direction, a resolution setting associated with audio processing is depicted and generally designated 700. The components 700 include, in addition to the components 600 of FIG. 6, an extended reality (XR) engine 710, such as a virtual reality engine, an augmented reality engine, or a mixed reality engine. The extended reality engine 710 includes a foveated rendering component 708 that is configured to perform foveated image rendering based on a user's head orientation and gaze direction.

Quantization zone data 702 that is generated by the XR engine 710 can be used by the audio decoder 604 to adjust decoding resolution for sound sources. For example, the quantization zone data 702 includes data indicating resolution areas 704, such as a central resolution area 720 and a peripheral resolution area 722. To illustrate, the resolution areas 704 may correspond to the regions described with reference to the peripheral mapping operation 502 of FIG. 5. The quantization zone data 702 also includes an indication of de-quantization bits 706 allocated for de-quantizing audio data of sound sources mapped to the different resolution areas 704. For example, the de-quantization bits 706 may indicate that a larger number of de-quantization bits are used for decoding audio data of sound sources mapped to the central resolution area 720 and a smaller number of de-quantization bits are used for decoding audio data of sound sources mapped to the peripheral resolution area 722.

In some implementations, the renderer 610 is configured to perform foveated rendering of the audio data based on the quantization zone data 702. For example, the renderer 610 can operate using a resolution setting (e.g., an amount of the processor resources 624) for each sound source that indicates at least one of the central resolution area 720 or the peripheral resolution area 722 associated with the viewing direction, instead of, or in addition to, determining a resolution setting based on receiving the eye gaze direction 125 at the renderer 610.

In an illustrative implementation, the components 700 are implemented by the one or more processors 120 of FIG. 1. The one or more processors 120 may include the extended reality engine 710, and the extended reality engine 710 may be configured to generate the direction data 106. The resolution setting 150 of FIG. 1 may be based on the quantization zone data 702 from the foveated rendering component 708 of the extended reality engine 710. To illustrate, the de-quantization bits 706 generated by the extended reality engine 710 may correspond to a set of resolution settings that indicate a resolution setting 150 corresponding to each of the resolution areas 704.

By adjusting resolution associated with audio decoding, rendering, or both, based on the quantization zone data 702 generated by the extended reality engine 710, an amount of processing performed for resolution adjustment by the audio system may be reduced as compared to systems in which the quantization zone data is not provided by an extended reality engine.

Figure 8:
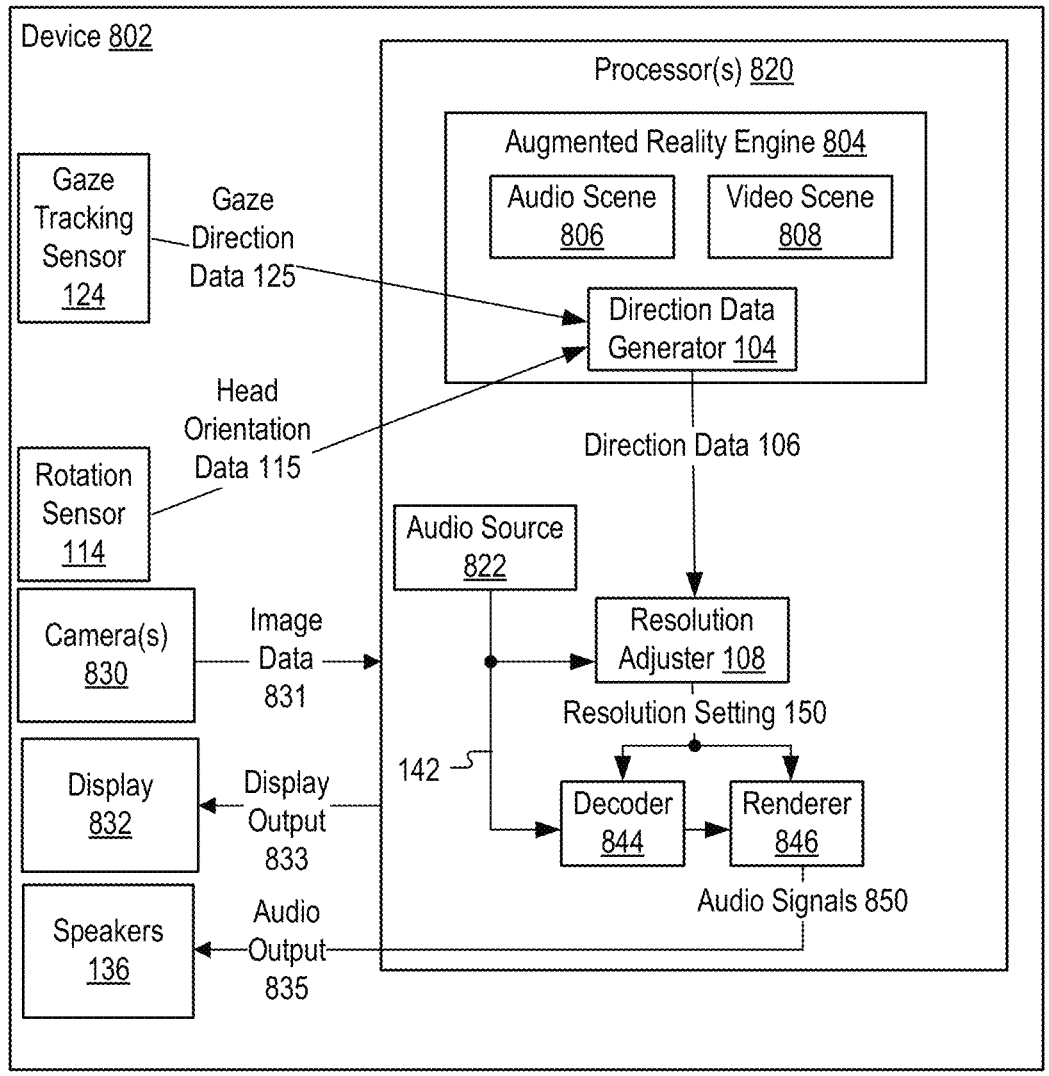
FIG. 8 is a diagram illustrating an example of an implementation of a system operable to adjust, based on a viewing direction, a resolution setting associated with audio processing, in accordance with some examples of the present disclosure.

Referring to FIG. 8, a particular illustrative aspect of a system configured to adjust, based on a viewing direction, a resolution setting associated with audio processing is depicted and generally designated 800. The system 800 includes a device 802 that incorporates functionality associated with the device 102 and the playback device 180 of FIG. 1 and that also includes an augmented reality engine 804.

The device 802 includes one or more processors 820 coupled to the gaze tracking sensor 124, the rotation sensor 114, and the speakers 136 of FIG. 1. The device 802 also includes one or more cameras 830 is configured to provide image data 831 to the one or more processors 820, a display device 832 configured to receive display output data 833 from the one or more processors 820 and to generate a visual display corresponding to the display output data 833 (e.g., on a display screen).

The one or more processors 820 include the augmented reality engine 804, the resolution adjuster 108, an audio source 822, a decoder 844, and a renderer 846. The augmented reality engine 804 includes the direction data generator 104 that is configured to generate the direction data 106 based on the gaze direction data 125, head orientation data 115, or a combination thereof. The augmented reality engine 804 is further configured to associate an audio scene 806 that is at least partially based on audio data from an audio source 822 with a video scene 808 generated by the augmented reality engine 804. For example, the audio scene 806 may be at least partially based on image data 831 from the one or more cameras 830 and at least partially based on virtual objects added by the augmented reality engine 804. The augmented reality engine 804 may perform gaze tracking operations to support generation of the audio scene 806, the video scene 808, or both, and the resulting direction data 106 may also be provided to the resolution adjuster 108 to adjust resolution associated with audio decoding and rendering.

The audio source 822 may correspond to the audio source 122 of FIG. 2 and may provide audio data to the resolution adjuster 108 and a decoder 844. In an example, the audio source 822 generates the audio bitstream 148, including the audio data 127 and the metadata 126 of FIG. 1, based on operations associated with the augmented reality engine 804. To illustrate, the audio source 822 can generate the audio bitstream corresponding to the audio scene 806 (e.g., including virtual sounds from virtual sound sources) responsive to the augmented reality engine 804.

The resolution adjuster 108 determines a resolution setting 150 for each sound source represented in the audio bitstream 148, and the resolution settings 150 are used to adjust resolution at the decoder 844, to adjust operation of the renderer 846, or a combination thereof. The decoder 844 decodes the audio bitstream 148 to generate decoded audio data, and the renderer 846 renders the decoded audio data to generate processed audio data in the form of audio signals 850 that are provided as audio output 835 to the speakers 136.

By adjusting resolution associated with audio decoding, rendering, or both, based on the direction data 106 generated by the augmented reality engine 804, an amount of processing performed for resolution adjustment by an audio system of the device 802 may be reduced as compared to systems in which the direction data 106 is not provided by an augmented reality engine.

Referring to FIG. 9A, a diagram 900 depicts a graphical example of a gaze direction and directions to multiple sound sources associated with audio object coding format (e.g., Dolby, MPEG-H, or one or more other object standards). A vector $\hat{g}$ represents the viewing direction of a user at the origin of a polar coordinate system, a vector $\hat{V1}$ represents a direction of a first audio object, a vector $\hat{V2}$ represents a direction of a second audio object, and a vector $\hat{V3}$ represents a direction of a third audio object. Vectors are notated using "hats" above the vector labels to distinguish from the V-vectors of FIG. 3 (which are denoted using arrows above the vector labels). As illustrated, $\hat{V1}$ is most similar to $\hat{g}$ and $\hat{V3}$ is least similar to $\hat{g}$. In a particular implementation, $\hat{V1}$, $\hat{V2}$, and $\hat{V3}$ have been adjusted to compensate for a user's head orientation (e.g., detected by the rotation sensor 114 of FIG. 1), and $\hat{g}$ corresponds to the user's gaze direction (e.g., detected by the gaze tracking sensor 124 of FIG. 1). In a particular implementation, the vectors $\hat{g}$, $\hat{V1}$, $\hat{V2}$, and $\hat{V3}$ are normalized to simplify computation of the similarity between $\hat{g}$ and each of $\hat{V1}$, $\hat{V2}$, and $\hat{V3}$ (e.g., using cosine similarity). A field of view (FOV) of the user is illustrated as within FOV limits 906. In a particular example, the FOV limits are determined based on an angular offset (e.g., ±45 degrees) from $\hat{g}$.

Referring to FIG. 9B, a diagram 901 depicts a particular illustrative aspect of an encoder 912 configured to receive audio content including audio 927 and metadata 926 corresponding to the audio objects of FIG. 9A. The audio content represents sound sources as audio objects with associated audio corresponding to each audio object's audio energy and metadata corresponding to each audio object's position (e.g., a direction of the object in the polar coordinate system illustrated in FIG. 9A). In a particular implementation, the audio content is user-generated content, such as audio captured by the microphones 138 of FIG. 1 and converted to the audio object coding format. The encoder 912 also receives FOV data 920 that indicates the viewing direction $\hat{g}$ and the FOV limits 906 of FIG. 9A.

The encoder 912 includes a resolution adjuster 908A that is configured to determine, for each of the audio objects, a resolution setting based on a similarity between the viewing direction $\hat{g}$ and the direction of the audio object (e.g., a cosine similarity between $\hat{g}$ and each of $\hat{V1}$, $\hat{V2}$, and $\hat{V3}$). The encoder 912 is configured to encode the audio of each of the audio objects based on the audio objects' resolution settings. In an example, the encoder 912 performs a highest-precision energy quantization (e.g., using a largest number of bits) for the first audio object to introduce lowest quantization noise and performs a lowest-precision energy quantization (e.g., using a lowest number of bits) for the third audio object, which may result in higher quantization noise. In some implementations, the encoder 912 is configured to use a minimum resolution for encoding all audio objects that are outside of the FOV limits 906. According to some implementations, the encoder 912 is configured to discard audio objects that are outside of the FOV limits 906. The resulting encoded audio and corresponding metadata 926 are output as one or more bitstreams 914.

Referring to FIG. 9C, a diagram 902 depicts a particular illustrative aspect of a decoder 932 and an object renderer 936. The decoder 932 is configured to receive the FOV data 920 and an object bitstream 930 including the metadata 926 and encoded audio. The decoder 932 is configured to decode the object bitstream to provide decoded audio 934A to the object renderer 936.

The decoder 932 includes a resolution adjuster 908B that is configured to determine, for each of the audio objects represented in the object bitstream 930, a resolution setting based on a similarity between the viewing direction $\hat{g}$ and the direction of the audio object (e.g., a cosine similarity between $\hat{g}$ and each of $\hat{V1}$, $\hat{V2}$, and $\hat{V3}$), such as described for the resolution adjuster 908A. The decoder 932 is configured to decode the audio of each of the audio objects based on the audio objects' resolution settings. In an example, the decoder 932 uses a largest number of de-quantization bits for the first audio object to introduce lowest quantization noise and uses a smallest number of de-quantization bits for the third audio object, which may result in higher quantization noise. In some implementations, the decoder 932 is configured to use a minimum resolution for decoding all audio objects that are outside of the FOV limits 906. According to some implementations, the decoder 932 is configured to discard audio objects that are outside of the FOV limits 906. The resulting decoded audio 934A and the FOV data 920 are provided to the object renderer 936.

The object renderer 936 includes a resolution adjuster 908C and a metadata adjuster 940. The metadata adjuster 940 is configured to adjust the metadata to compensate for a head orientation of the user (e.g., rotate the audio scene). The resolution adjuster 908C is configured to determine, for each of the audio objects represented in the decoded audio 934A, a resolution setting based on a similarity between the viewing direction $\hat{g}$ and the direction of the audio object (e.g., after adjustment by the metadata adjuster 940), such as described for the resolution adjuster 908B. The object renderer 936 is configured to generate rendered audio based on each audio object's resolution settings. In an example, the object renderer 936 uses a highest resolution for the first audio object and uses a lowest resolution for the third audio object. In some implementations, the object renderer 936 is configured to use a minimum resolution for rendering all audio objects that are outside of the FOV limits 906. According to some implementations, the object renderer 936 is configured to bypass rendering of audio objects that are outside of the FOV limits 906. The resulting rendered audio, illustrated as binaural L and R signals, may be provided to multiple loudspeakers to be played out to the user.

Although the metadata adjuster 940 is depicted as a component of the object renderer 936, in other implementations the metadata adjuster 940 may be external to the decoder 932 and external to the object renderer 936, and the adjusted metadata generated by the metadata adjuster 940 may be provided to the decoder 932, to the object renderer 936, or both.

Referring to FIG. 9D, a diagram 903 depicts another particular illustrative aspect of the decoder 932 and the object renderer 936 in which the decoder 932 does not include the resolution adjuster 908B. The decoder 932 decodes the object bitstream 930 independently of the FOV data 920 to generate decoded audio 934B (e.g., the audio associated with each of the audio objects is de-quantized with equal precision). The decoded audio 934B is rendered by the object renderer 936 in a similar manner as described with reference to the object renderer 936 of FIG. 9C.

Referring to FIG. 9E, a diagram 904 depicts a particular illustrative aspect of the decoder 932 and the object renderer 936 in which the decoder 932 includes the resolution adjuster 908B but the object renderer 936 does not include the resolution adjuster 908C. The decoder 932 decodes the object bitstream 930 as described with reference to FIG. 9C. The resulting decoded audio 934C is rendered by the object renderer 936 without adjusting resolution based on the FOV limits 906 or the viewing direction.

Figure 10:
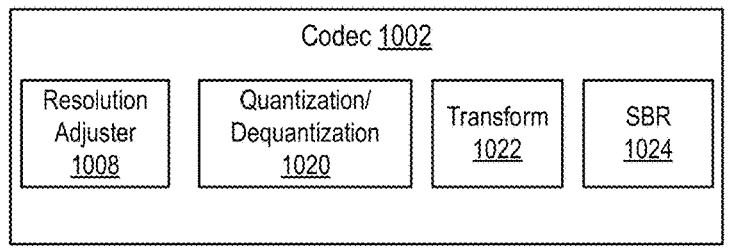
FIG. 10 is a block diagram illustrating an implementation of a codec operable to adjust, based on a viewing direction, a resolution setting associated with audio processing, in accordance with some examples of the present disclosure.

Referring to FIG. 10, an example 1000 of a codec 1002 is depicted that is configured to perform resolution adjustment to one or more operations associated with encoding or decoding audio signals. The codec 1002 includes a resolution adjuster 1008 that is configured to determine a resolution setting for processing audio of an audio source based on a similarity between a viewing direction and a direction of the audio source, such as in a similar manner as described with reference to the resolution adjuster 108 of FIG. 1.

In some implementations, a resolution setting determined by the resolution adjuster 1008 is used in conjunction with a quantization or dequantization operation 1020. For example, a number of quantization bits, a number of dequantization bits, or both, can be increased to provide higher resolution when operating on data associated with sound sources having directions that are more similar to the viewing direction and decreased to reduce processing load, latency, bandwidth, power consumption, or a combination thereof, when operating on data associated with sound sources having directions that are less similar to the viewing direction.

In some implementations, a resolution setting determined by the resolution adjuster 1008 is used in conjunction with a transform operation 1022, such as a modified discrete cosine transform (MDCT), an inverse MDCT (IMDCT), a discrete cosine transform (DCT), an inverse DCT (IDCT), any other type of transform or inverse transform, or any combination thereof. For example, a number of bits used in the transform operation 1022 can be increased to provide higher precision when operating on data associated with sound sources having directions that are more similar to the viewing direction and decreased to reduce processing load, latency, bandwidth, power consumption, or a combination thereof when operating on data associated with sound sources having directions that are less similar to the viewing direction.

In some implementations, a resolution setting determined by the resolution adjuster is used in conjunction with a spectral band replication (SBR) operation 1024. For example, the SBR operation 1024 can be activated, or performed with higher resolution, to provide higher precision when operating on data associated with sound sources having directions that are more similar to the viewing direction and deactivated, or performed with lower resolution, to reduce processing load, latency, bandwidth, power consumption, or a combination thereof when operating on data associated with sound sources having directions that are less similar to the viewing direction.

Although the codec 1002 is described as enabling resolution adjustment for quantization/dequantization operations, transform operations, and SBR operations, such examples are provided for purposes of illustration rather than limitation. In other implementations, one or more other operations associated with encoding or decoding of data can be adjusted in a similar manner to enable higher resolution for sources nearer the viewing direction of the user and to reduce processing load, latency, bandwidth, power consumption, or a combination thereof for sources further from the viewing direction of the user and for which a reduced resolution may not be perceived by the user.

Figure 11:
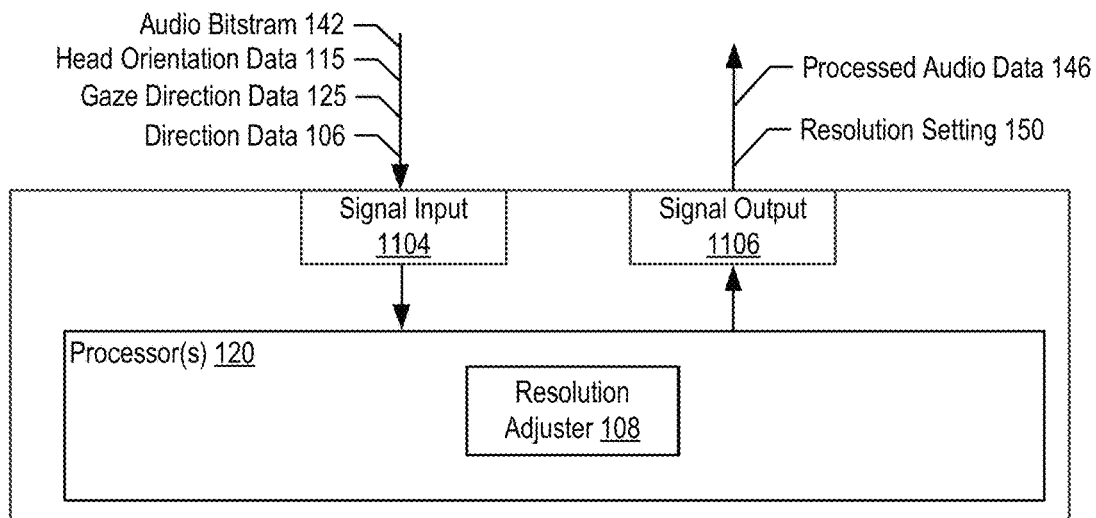
FIG. 11 is a block diagram illustrating an implementation of an integrated circuit operable to adjust, based on a viewing direction, a resolution setting associated with audio processing, in accordance with some examples of the present disclosure.

FIG. 11 is a block diagram illustrating an implementation 1100 of the first device 102 as an integrated circuit 1102 for audio resolution based on viewing direction. The integrated circuit 1102 includes the one or more processors 120. The one or more processors 120 include the resolution adjuster 108. The integrated circuit 1102 also includes a signal input 1104, such as a bus interface, to enable the audio bitstream 148, the head orientation data 115, the gaze direction data 125, the direction data 106, or a combination thereof, to be received. The integrated circuit 1102 also includes a signal output 1106, such as a bus interface, to enable outputting the processed audio data 146, the resolution setting 150, or both. The integrated circuit 1102 enables implementation of sound field adjustment as a component in a system that includes a playback device 180, as depicted in FIG. 1.

FIG. 12 depicts an implementation 1200 in which the device 102 includes a mobile device 1202, such as a phone or tablet, as illustrative, non-limiting examples. The mobile device 1202 includes the speakers 136 and a display screen 1204. Components of the one or more processors 120, including the resolution adjuster 108, are integrated in the mobile device 1202 and are illustrated using dashed lines to indicate internal components that are not generally visible to a user of the mobile device 1202. In a particular example, the resolution adjuster 108 operates to determine the resolution setting 150 of FIG. 1 that is used to perform resolution-adjusted audio decoding and rendering for playout via the speakers 136.

FIG. 13 depicts an implementation 1300 in which the device 102 includes a headset device 1302. The headset device 1302 includes the speakers 136 and one or more of the microphones 138. Components of the processor 120, including the resolution adjuster 108, are integrated in the headset device 1302. In a particular example, the resolution adjuster 108 operates to determine the resolution setting 150 of FIG. 1 that is used to perform resolution-adjusted audio decoding and rendering for playout via the speakers 136, to perform resolution-adjusted audio encoding of sound captured by the microphones 138 for transmission of the resolution adjusted audio to a second device (not shown) for further processing, or both.

FIG. 14 depicts an implementation 1400 of a wearable electronic device 1402, illustrated as a "smart watch." In a particular aspect, the wearable electronic device 1402 includes the device 102.

The resolution adjuster 108 is integrated into the wearable electronic device 1402. In a particular aspect, the wearable electronic device 1402 is coupled to or includes the speakers 136. In a particular example, the resolution adjuster 108 operates to determine the resolution setting 150 of FIG. 1 that is used to generate resolution adjusted audio, which is then processed to perform one or more operations at the wearable electronic device 1402, such as to launch a graphical user interface or otherwise display other information associated with the resolution adjusted audio at a display screen 1404 of the wearable electronic device 1402. To illustrate, the wearable electronic device 1402 may include a display screen that is configured to display a notification indicating that audio resolution is being configured by the wearable electronic device 1402. In a particular example, the wearable electronic device 1402 includes a haptic device that provides a haptic notification (e.g., vibrates) indicating audio resolution configuration. For example, the haptic notification can cause a user to look at the wearable electronic device 1402 to see a displayed notification indicating that the audio resolution is being configured. The wearable electronic device 1402 can thus alert a user with a hearing impairment or a user wearing a headset that the audio resolution is being configured.

FIG. 15 is an implementation 1500 of a wireless speaker and voice activated device 1502. In a particular aspect, the wireless speaker and voice activated device 1502 includes the device 102 of FIG. 1.

The wireless speaker and voice activated device 1502 can have wireless network connectivity and is configured to execute an assistant operation. The one or more processors 120 including the resolution adjuster 108 are included in the wireless speaker and voice activated device 1502. In a particular aspect, the wireless speaker and voice activated device 1502 includes or is coupled to the one or more speakers 136, the one or more microphones 138, or a combination thereof. During operation, the resolution adjuster 108 determines the resolution setting 150 of FIG. 1 that is used to generate resolution adjusted audio. In response to receiving a verbal command identified as user speech in the resolution adjusted audio, the wireless speaker and voice activated device 1502 can execute assistant operations, such as via execution of a voice activation system (e.g., an integrated assistant application). The assistant operations can include adjusting a temperature, playing music, turning on lights, etc. For example, the assistant operations are performed responsive to receiving a command after a keyword or key phrase (e.g., "hello assistant").

FIG. 16 depicts an implementation 1600 in which the device 102 includes a portable electronic device that corresponds to a camera device 1602. The resolution adjuster 108, the speaker 136, the microphone 138, or a combination thereof, are included in the camera device 1602. During operation, the resolution adjuster 108 determines the resolution setting 150 of FIG. 1 that is used to generate resolution adjusted audio. In response to receiving a verbal command identified as user speech in the resolution adjusted audio, the camera device 1602 can execute operations responsive to spoken user commands, such as to adjust image or video capture settings, image or video playback settings, or image or video capture instructions, as illustrative examples.

FIG. 17 depicts an implementation 1700 of a portable electronic device that corresponds to an extended reality headset 1702, such as a virtual reality, augmented reality, or mixed reality headset. In a particular aspect, the headset 1702 includes the device 102 of FIG. 1.

The resolution adjuster 108, the speakers 136, or a combination thereof, are integrated into the headset 1702. In a particular aspect, the resolution adjuster 108 determines the resolution setting 150 of FIG. 1 that is used to generate resolution adjusted audio. The resolution adjusted audio is output via the speakers 136. A visual interface device is positioned in front of the user's eyes to enable display of augmented reality or virtual reality images or scenes to the user while the headset 1702 is worn.

FIG. 18 depicts an implementation 1800 in which the device 102 corresponds to or is integrated within a vehicle 1802, illustrated as a manned or unmanned aerial device (e.g., a package delivery drone). In some implementations, the one or more processors 120 (e.g., including the resolution adjuster 108) are integrated into the vehicle 1802. In a particular aspect, the vehicle 1802 includes or is coupled to the one or more speakers 136, the one or more microphones 138, or a combination thereof.

The resolution adjuster 108 determines the resolution setting 150 of FIG. 1 based on the direction data 106 of FIG. 1 to generate resolution adjusted audio (e.g., the processed audio data 146 of FIG. 1). In some implementations, the vehicle 1802 is manned (e.g., carries a pilot, one or more passengers, or both) and the direction data 106 is based on the gaze direction 190, the head orientation 192, or both, of a pilot or a passenger of the vehicle 1802. In another implementation in which the vehicle 1802 is unmanned and the one or more speakers 136 are on an external surface of the vehicle 1802, the direction data 106 is based on the gaze direction 190, the head orientation 192, or both, of a listener. Alternatively, or in addition, the vehicle 1802 may move (e.g., circle an outdoor audience during a concert) while playing out audio, and the one or more processors 120 (e.g., including the resolution adjuster 108) may perform operations to adjust the resolution setting 150 based on translation and rotation of the vehicle 1802.

FIG. 19 depicts an implementation 1900 in which the device 102 corresponds to, or is integrated within, a vehicle 1902, illustrated as a car that also includes multiple loudspeakers 136 configured to generate sound based on processed audio data and one or more sensors 1990 configured to provide, to the one or more processors 120, sensor data indicative of the viewing direction of a user (e.g., a driver or passenger of the vehicle 1920). In some implementations, the one or more processors 120 (e.g., including the resolution adjuster 108) are integrated into the vehicle 1902, and the direction data 106 is based on the gaze direction 190, the head orientation 192, or both, of a driver or passenger of the vehicle 1902. In some implementations, the gaze direction data 125, the head orientation data 115, or both, are sent to a remote server, such as the device 102. Audio data from the remote server (e.g., the processed audio data 146) may be received at the vehicle 1902 to playout at the one or more speakers 136 of the vehicle 1902. For example, playout of navigation data (e.g., spoken driving directions to a destination) may be adjusted to appear to the occupants of the vehicle 1902 that the spoken directions originate from the location or direction of the navigation destination and may thus provide additional information, encoded into the perception of distance and direction of the source of the spoken navigation directions, to a driver of the vehicle 1902.

Figure 20:
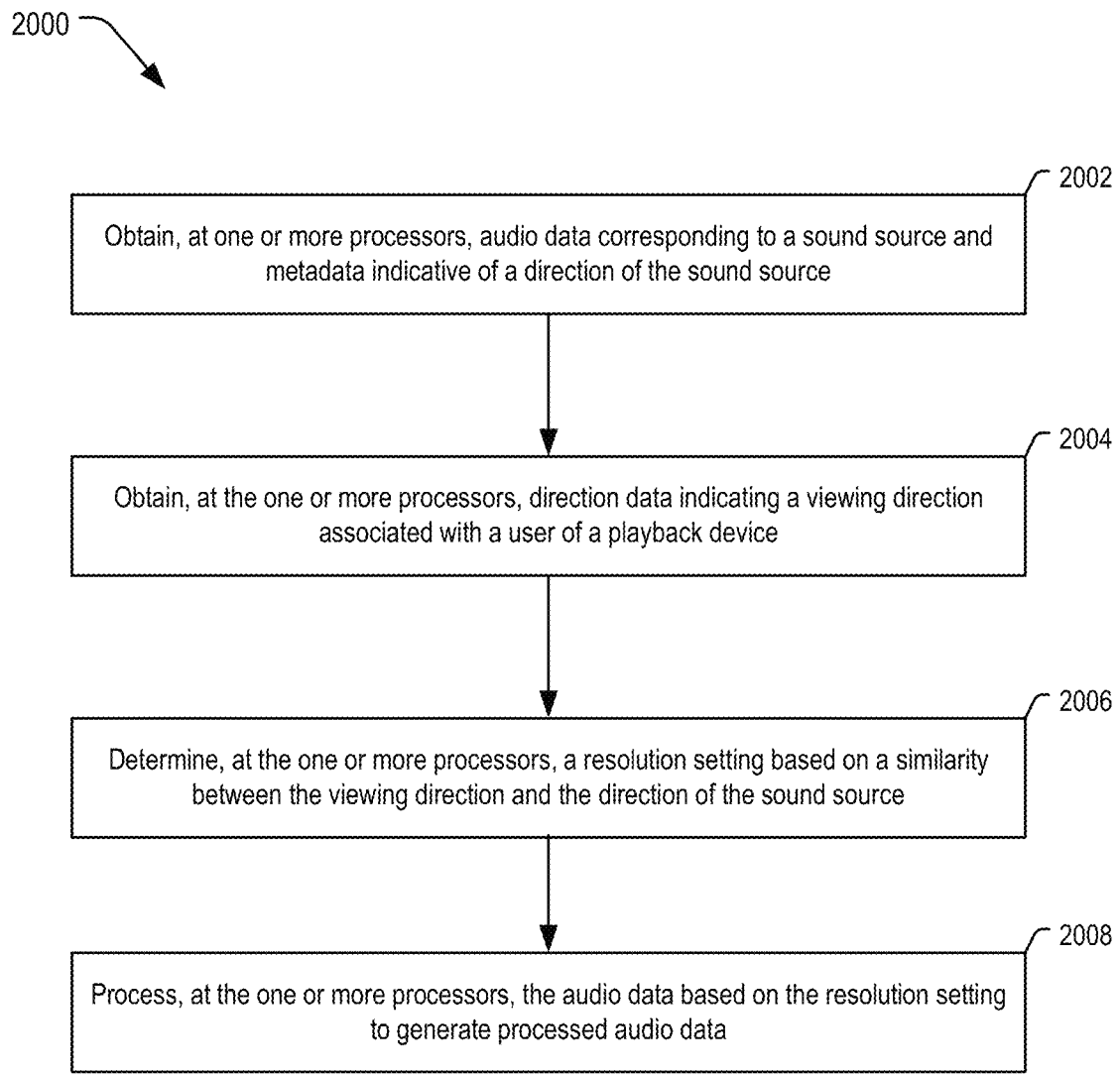
FIG. 20 is a diagram of a particular implementation of a method of adjusting, based on a viewing direction, a resolution setting associated with audio processing, in accordance with some examples of the present disclosure.

FIG. 20 illustrates an example of a method 2000 for adjusting, based on a viewing direction, a resolution setting associated with audio processing. One or more operations of the method 2000 may be performed by the direction data generator 104, the resolution adjuster 108, the audio processing 144, the one or more processors 120, the device 102, the system 100 of FIG. 1, the resolution adjuster 208A, the resolution adjuster 208B, the resolution adjuster 208C, the audio scene adjuster 224, the second device 202, the system 200 of FIG. 2, the resolution adjuster 308 of FIG. 3, the augmented reality engine 804, the renderer 846, the one or more processors 820, the device 802, the system 800 of FIG. 8, the resolution adjuster 908A of FIG. 9B, the resolution adjuster 908C, the object renderer 936 of FIG. 9C, or a combination thereof, as illustrative, non-limiting examples.

The method 2000 includes obtaining, at one or more processors, audio data corresponding to a sound source and metadata indicative of a direction of the sound source, at 2002. For example, the one or more processors 120 of FIG. 1 obtain the audio data 127 and the metadata 126 representing the first sound source 184A, second audio data and second metadata representing the second sound source 184B, and third audio data and third metadata representing the third sound source 184C, as described with reference to FIG. 1.

The method 2000 also includes obtaining, at the one or more processors, direction data indicating a viewing direction associated with a user of a playback device, at 2004. For example, the one or more processors 120 of FIG. 1 obtain the direction data 106 indicating the viewing direction 105 associated with the user 182 of the playback device 180, as described with reference to FIG. 1.

The method 2000 further includes determining, at the one or more processors, a resolution setting based on a similarity between the viewing direction and the direction of the sound source, at 2006. For example, the one or more processors 120 of FIG. 1 determine the resolution setting 150 based on the similarity 140 between the viewing direction 105 and a direction of the first sound source 184A, as described with reference to FIG. 1.

The method 2000 also includes processing, at the one or more processors, the audio data based on the resolution setting to generate processed audio data, at 2008. For example, the one or more processors 120 process the audio data 127 based on the resolution setting 150 to generate the processed audio data 146 corresponding to sound from the first sound source 184A, as described with reference to FIG. 1.

The method 2000 of FIG. 20 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2000 of FIG. 20 may be performed by a processor that executes instructions, such as described with reference to FIG. 21.

Figure 21:
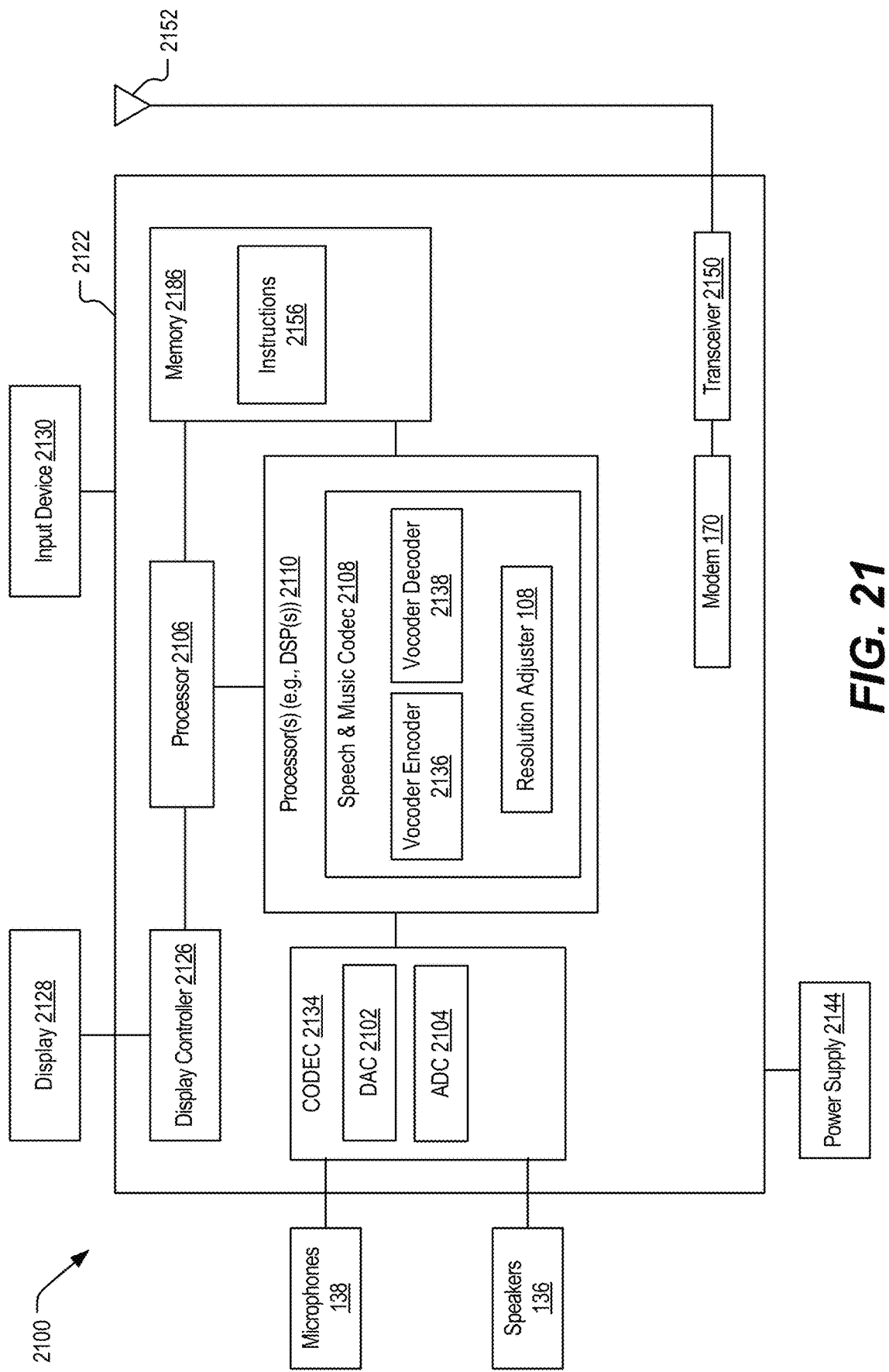
FIG. 21 is a block diagram of a particular illustrative example of a device that is operable to adjust, based on a viewing direction, a resolution setting associated with audio processing, in accordance with some examples of the present disclosure.

Referring to FIG. 21, a block diagram of a particular illustrative implementation of a device is depicted and generally designated 2100. In various implementations, the device 2100 may have more or fewer components than illustrated in FIG. 21. In an illustrative implementation, the device 2100 may correspond to the device 102 of FIGS. 1-2 or the second device 202 of FIG. 2. In an illustrative implementation, the device 2100 may perform one or more operations described with reference to FIGS. 1-20.

In a particular implementation, the device 2100 includes a processor 2106 (e.g., a CPU). The device 2100 may include one or more additional processors 2110 (e.g., one or more DSPs). In a particular implementation, the one or more processors 120 of FIGS. 1-2, the one or more processors 220 of FIG. 2, or a combination thereof correspond to the processor 2106, the processors 2110, or a combination thereof. For example, the processors 2110 may include a speech and music coder-decoder (CODEC) 2108. The speech and music codec 2108 may include a voice coder ("vocoder") encoder 2136, a vocoder decoder 2138, the resolution adjuster 108, or a combination thereof.

The device 2100 may include a memory 2186 and a CODEC 2134. The memory 2186 may include instructions 2156, that are executable by the one or more additional processors 2110 (or the processor 2106) to implement the functionality described with reference to the resolution adjuster 108. The device 2100 may include the modem 170 coupled, via a transceiver 2150, to an antenna 2152. The transceiver 2150 may correspond to the transceiver 130, the transceiver 230, or both, of FIG. 2. In implementations in which the device 2100 corresponds to a sending device, the modem 170 may be configured to modulate audio data for transmission to a playback device, and the antenna 2152 may be configured to transmit the modulated audio data to the playback device. In implementations in which the device 2100 corresponds to a playback device, the antenna 2152 may be configured to receive modulated transmission data that represents encoded audio data, and the modem 170 may be configured to demodulate the received modulated transmission data to generate the encoded audio data.

The device 2100 may include a display 2128 coupled to a display controller 2126. The speakers 136, the microphones 138, or a combination thereof, may be coupled to the CODEC 2134. The CODEC 2134 may include a digital-to-analog converter (DAC) 2102 and an analog-to-digital converter (ADC) 2104. In a particular implementation, the CODEC 2134 may receive analog signals from the microphones 138, convert the analog signals to digital signals using the analog-to-digital converter 2104, and send the digital signals to the speech and music codec 2108. In a particular implementation, the speech and music codec 2108 may provide digital signals to the CODEC 2134. The CODEC 2134 may convert the digital signals to analog signals using the digital-to-analog converter 2102 and may provide the analog signals to the speakers 136.

In a particular implementation, the device 2100 may be included in a system-in-package or system-on-chip device 2122. In a particular implementation, the memory 2186, the processor 2106, the processors 2110, the display controller 2126, the CODEC 2134, and the modem 170 are included in a system-in-package or system-on-chip device 2122. In a particular implementation, an input device 2130 (e.g., the playback device 180, the gaze tracking sensor 124, the rotation sensor 114, or a combination thereof) and a power supply 2144 are coupled to the system-in-package or system-on-chip device 2122. Moreover, in a particular implementation, as illustrated in FIG. 21, the display 2128, the input device 2130, the speakers 136, the microphones 138, the antenna 2152, and the power supply 2144 are external to the system-in-package or system-on-chip device 2122. In a particular implementation, each of the display 2128, the input device 2130, the speakers 136, the microphones 138, the antenna 2152, and the power supply 2144 may be coupled to a component of the system-in-package or system-on-chip device 2122, such as an interface or a controller.

The device 2100 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described techniques, an apparatus includes means for obtaining audio data corresponding to a sound source and metadata indicative of a direction of the sound source. For example, the means for obtaining the audio data and the metadata includes the resolution adjuster 108, the one or more processors 120, the device 102, the system 100 of FIG. 1, the encoder 128, the audio scene adjuster 224, the renderer 222, the one or more processors 220, the second device 202, the system 200 of FIG. 2, the resolution adjuster 308 of FIG. 3, the audio decoder 604, the renderer 610 of FIG. 6, the one or more processors 820, the device 802, the system 800 of FIG. 8, the resolution adjuster 908A, the encoder 912 of FIG. 9B, the processor 2106, the processor 2110, the transceiver 2150, one or more other circuits or devices to obtain the audio data, or a combination thereof.

The apparatus also includes means for obtaining direction data indicating a viewing direction associated with a user of a playback device. For example, the means for obtaining the direction data includes the direction data generator 104, the resolution adjuster 108, the gaze tracking sensor 124, the one or more processors 120, the device 102, the system 100 of FIG. 1, the audio scene adjuster 224, the renderer 222, the one or more processors 220, the second device 202, the system 200 of FIG. 2, the resolution adjuster 308 of FIG. 3, the renderer 610 of FIG. 6, the one or more processors 820, the device 802, the system 800 of FIG. 8, the resolution adjuster 908A, the encoder 912 of FIG. 9B, the processor 2106, the processor 2110, the transceiver 2150, one or more other circuits or devices to obtain the direction data, or a combination thereof.

The apparatus further includes means for determining a resolution setting based on a similarity between the viewing direction and the direction of the sound source. For example, the means for determining the resolution setting includes the resolution adjuster 108, the one or more processors 120, the device 102, the system 100 of FIG. 1, the resolution adjuster 208A, the encoder 128, the resolution adjuster 208B, the decoder 228, the audio scene adjuster 224, the resolution adjuster 208C, the renderer 222, the one or more processors 220, the second device 202 of FIG. 2, the resolution adjuster 308 of FIG. 3, the renderer 610 of FIG. 6, the one or more processors 820, the device 802, the system 800 of FIG. 8, the resolution adjuster 908A, the encoder 912 of FIG. 9B, the processor 2106, the processor 2110, one or more other circuits or devices to determine the resolution setting based on the similarity, or a combination thereof.

The apparatus also includes means for processing the audio data based on the resolution setting to generate processed audio data. For example, the means for processing the audio data includes the one or more processors 120, the device 102, the system 100 of FIG. 1, the encoder 128, the audio scene adjuster 224, the renderer 222, the one or more processors 220, the second device 202, the system 200 of FIG. 2, the encoder 310 of FIG. 3, the renderer 610 of FIG. 6, the decoder 844, the renderer 846, the one or more processors 820, the device 802, the system 800 of FIG. 8, the encoder 912 of FIG. 9B, the decoder 932, the object renderer 936 of FIG. 9C, the processor 2106, the processor 2110, one or more other circuits or devices to process the audio data based on the resolution data, or a combination thereof.

In some implementations, a non-transitory computer-readable medium (e.g., a computer-readable storage device, such as the memory 110, the memory 210, or the memory 3286) includes instructions (e.g., the instructions 112, the instructions 212, or the instructions 2156) that, when executed by one or more processors (e.g., the one or more processors 120, the one or more processors 220, the one or more processors 820, the processor 2106, or the one or more processors 2110), cause the one or more processors to perform operations corresponding to at least a portion of any of the techniques described with reference to FIGS. 1-19 or FIG. 21, the method of FIG. 20, or any combination thereof.

Particular aspects of the disclosure are described below in the following sets of interrelated clauses:

According to Clause 1, a device includes: a memory configured to store instructions; and one or more processors configured to execute the instructions to: obtain audio data corresponding to a sound source and metadata indicative of a direction of the sound source; obtain direction data indicating a viewing direction associated with a user of a playback device; determine a resolution setting based on a similarity between the viewing direction and the direction of the sound source; and process the audio data based on the resolution setting to generate processed audio data.

Clause 2 includes the device of Clause 1, wherein the one or more processors are configured to execute the instructions to perform higher-resolution audio processing for one or more sound sources that are closer to the viewing direction than for one or more other sound sources that are further from the viewing direction.

Clause 3 includes the device of Clause 1 or Clause 2, wherein the one or more processors are configured to execute the instructions to: obtain second audio data corresponding to a second sound source and second metadata indicative of a second direction of the second sound source, wherein the viewing direction is more similar to the direction of the sound source than to the second direction of the second sound source; determine a second resolution setting based on a second similarity between the viewing direction and the second direction, wherein the second resolution setting corresponds to a lower resolution for the second audio data than for the audio data; and process the second audio data based on the second resolution setting.

Clause 4 includes the device of any of Clauses 1 to 3, wherein the resolution setting corresponds to at least one of a coarse resolution level or a fine resolution level.

Clause 5 includes the device of Clause 4, wherein the fine resolution level includes one or more of multiple fine resolution sub-levels.

Clause 6 includes the device of any of Clauses 1 to 5, wherein the resolution setting corresponds to a number of bits used in conjunction with processing the audio data.

Clause 7 includes the device of any of Clauses 1 to 6, wherein the resolution setting corresponds to an amount of quantization noise associated with processing the audio data.

Clause 8 includes the device of any of Clauses 1 to 7, wherein the one or more processors include an encoder configured to encode the audio data based on the resolution setting to generate the processed audio data corresponding to encoded audio data.

Clause 9 includes the device of Clause 8, wherein the audio data and the metadata are included in ambisonics transport format data that includes, for each particular sound source of multiple sound sources: a U-vector, of multiple U-vectors in the ambisonics transport format data, that corresponds to a sound energy from that particular sound source; and a V-vector, of multiple V-vectors in the ambisonics transport format data, that corresponds to a direction of that particular sound source, and wherein the audio data is included in a particular U-vector of the multiple U-vectors and the metadata is included in a particular V-vector of the multiple V-vectors.

Clause 10 includes the device of Clause 8, wherein the audio data and the metadata are included in audio object coding format data that includes an audio signal and object direction metadata for each object of multiple objects, wherein the sound source corresponds to a particular object of the multiple objects, and wherein the resolution setting indicates a number of bits used to encode the audio data.

Clause 11 includes the device of any of Clauses 1 to 7, wherein the audio data corresponds to encoded audio data, and wherein the one or more processors include a decoder configured to decode the encoded audio data based on the resolution setting to generate the processed audio data corresponding to decoded audio data.

Clause 12 includes the device of Clause 11, wherein the resolution setting indicates a number of resolution levels of the encoded audio data to decode.

Clause 13 includes the device of Clause 11 or Clause 12, wherein the resolution setting indicates a number of bits of the encoded audio data to decode.

Clause 14 includes the device of any of Clauses 1 to 7, wherein the one or more processors include a renderer configured to render the audio data based on the resolution setting to generate the processed audio data corresponding to rendered audio.

Clause 15 includes the device of Clause 14, wherein the resolution setting indicates an amount of processing resources used to render the audio data.

Clause 16 includes the device of Clause 14 or Clause 15, wherein the resolution setting indicates whether to bypass rendering the audio data based on the similarity being less than a threshold similarity.

Clause 17 includes the device of any of Clauses 14 to 16, wherein the renderer is configured to perform foveated rendering of the audio data, wherein the resolution setting indicates at least one of a central vision area or a peripheral vision area associated with the viewing direction.

Clause 18 includes the device of any of Clauses 1 to 17, wherein the viewing direction corresponds to a head orientation of the user.

Clause 19 includes the device of any of Clauses 1 to 18, wherein the viewing direction corresponds to a gaze direction of the user.

Clause 20 includes the device of any of Clauses 1 to 19, wherein the one or more processors include an extended reality engine that is configured to generate the direction data.

Clause 21 includes the device of Clause 20, wherein the resolution setting is based on quantization zone data from a foveated rendering component of the extended reality engine.

Clause 22 includes the device of any of Clauses 1 to 19, wherein the one or more processors include an augmented reality engine that is configured to generate the direction data based on gaze direction data, and wherein the one or more processors are further configured to associate an audio scene that is at least partially based on the audio data with a video scene corresponding to the augmented reality engine.

Clause 23 includes the device of any of Clauses 1 to 19 or 22, wherein the one or more processors include an augmented reality engine that is configured to generate the direction data based on head orientation data, and wherein the one or more processors are further configured to associate an audio scene that is at least partially based on the audio data with a video scene corresponding to the augmented reality engine.

Clause 24 includes the device of any of Clauses 1 to 23, further including a modem coupled to the one or more processors, the modem configured to receive the audio data from a second device.

Clause 25 includes the device of any of Clauses 1 to 23, further including a modem coupled to the one or more processors, the modem configured to receive the direction data from the playback device.

Clause 26 includes the device of any of Clauses 1 to 23, further including a modem coupled to the one or more processors, the modem configured to transmit the processed audio data to the playback device.

Clause 27 includes the device of any of Clauses 1 to 26, wherein the one or more processors are included in the playback device, and further including: multiple loudspeakers configured to generate sound based on the processed audio data; and one or more sensors configured to provide sensor data to the one or more processors, wherein the direction data is based on the sensor data.

Clause 28 includes the device of any of Clauses 1 to 27, wherein the one or more processors are integrated in a mobile phone.

Clause 29 includes the device of any of Clauses 1 to 27, wherein the one or more processors are integrated in a tablet computer device.

Clause 30 includes the device of any of Clauses 1 to 27, wherein the one or more processors are integrated in a camera device.

Clause 31 includes the device of any of Clauses 1 to 27, wherein the one or more processors are integrated in a virtual reality headset, a mixed reality headset, or an augmented reality headset.

Clause 32 includes the device of any of Clauses 1 to 27, wherein the one or more processors are integrated in a wearable electronic device.

Clause 33 includes the device of any of Clauses 1 to 27, wherein the one or more processors are integrated in a vehicle, the vehicle further including: multiple loudspeakers configured to generate sound based on the processed audio data; and one or more sensors configured to provide, to the one or more processors, sensor data indicative of the viewing direction of the user.

According to Clause 34, a method includes: obtaining, at one or more processors, audio data corresponding to a sound source and metadata indicative of a direction of the sound source; obtaining, at the one or more processors, direction data indicating a viewing direction associated with a user of a playback device; determining, at the one or more processors, a resolution setting based on a similarity between the viewing direction and the direction of the sound source; and processing, at the one or more processors, the audio data based on the resolution setting to generate processed audio data.

Clause 35 includes the method of Clause 34, wherein processing the audio data includes performing higher-resolution audio processing for one or more sound sources that are closer to the viewing direction than for one or more other sound sources that are further from the viewing direction.

Clause 36 includes the method of Clause 34 or Clause 35, further including: obtaining second audio data corresponding to a second sound source and second metadata indicative of a second direction of the second sound source, wherein the viewing direction is more similar to the direction of the sound source than to the second direction of the second sound source; determining a second resolution setting based on a second similarity between the viewing direction and the second direction, wherein the second resolution setting corresponds to a lower resolution for the second audio data than for the audio data; and processing the second audio data based on the second resolution setting.

Clause 37 includes the method of any of Clauses 34 to 36, wherein the resolution setting corresponds to at least one of a coarse resolution level or a fine resolution level.

Clause 38 includes the method of Clause 37, wherein the fine resolution level includes one or more of multiple fine resolution sub-levels.

Clause 39 includes the method of any of Clauses 34 to 38, wherein the resolution setting corresponds to a number of bits used in conjunction with processing the audio data.

Clause 40 includes the method of any of Clauses 34 to 39, wherein the resolution setting corresponds to an amount of quantization noise associated with processing the audio data.

Clause 41 includes the method of any of Clauses 34 to 40, wherein processing the audio data includes encoding the audio data.

Clause 42 includes the method of any of Clauses 34 to 41, wherein processing the audio data includes encoding the audio data based on the resolution setting to generate the processed audio data corresponding to encoded audio data.

Clause 43 includes the method of Clause 42, wherein the audio data and the metadata are included in ambisonics transport format data that includes, for each particular sound source of multiple sound sources: a U-vector, of multiple U-vectors in the ambisonics transport format data, that corresponds to a sound energy from that particular sound source; and a V-vector, of multiple V-vectors in the ambisonics transport format data, that corresponds to a direction of that particular sound source, and wherein the audio data is included in a particular U-vector of the multiple U-vectors and the metadata is included in a particular V-vector of the multiple V-vectors.

Clause 44 includes the method of Clause 42, wherein the audio data and the metadata are included in audio object coding format data that includes an audio signal and object direction metadata for each object of multiple objects, wherein the sound source corresponds to a particular object of the multiple objects, and wherein the resolution setting indicates a number of bits used to encode the audio data.

Clause 45 includes the method of any of Clauses 34 to 40, wherein processing the audio data includes decoding the audio data.

Clause 46 includes the method of any of Clauses 34 to 40 or 45, wherein the audio data corresponds to encoded audio data, and wherein processing the audio data includes decoding the encoded audio data based on the resolution setting to generate the processed audio data corresponding to decoded audio data.

Clause 47 includes the method of Clause 46, wherein the resolution setting indicates a number of resolution levels of the encoded audio data to decode.

Clause 48 includes the method of Clause 46 or Clause 47, wherein the resolution setting indicates a number of bits of the encoded audio data to decode.

Clause 49 includes the method of any of Clauses 34 to 40, wherein processing the audio data includes rendering the audio data.

Clause 50 includes the method of any of Clauses 34 to 40 or 49, wherein processing the audio data includes rendering the audio data based on the resolution setting to generate the processed audio data corresponding to rendered audio.

Clause 51 includes the method of Clause 50, wherein the resolution setting indicates an amount of processing resources used to render the audio data.

Clause 52 includes the method of Clause 50 or Clause 51, wherein the resolution setting indicates whether to bypass rendering the audio data based on the similarity being less than a threshold similarity.

Clause 53 includes the method of any of Clauses 50 to 52, wherein rendering the audio data includes performing foveated rendering of the audio data, wherein the resolution setting indicates at least one of a central vision area or a peripheral vision area associated with the viewing direction.

Clause 54 includes the method of any of Clauses 34 to 53, wherein the viewing direction corresponds to a head orientation of the user.

Clause 55 includes the method of any of Clauses 34 to 54, wherein the viewing direction further corresponds to a gaze direction of the user.

Clause 56 includes the method of any of Clauses 34 to 55, wherein the direction data is generated by an extended reality engine.

Clause 57 includes the method of Clause 56, wherein the resolution setting is based on quantization zone data from a foveated rendering component of the extended reality engine.

Clause 58 includes the method of any of Clauses 34 to 55, wherein the direction data is generated by an augmented reality engine based on gaze direction data.

Clause 59 includes the method of any of Clauses 34 to 58, wherein the direction data is generated by an augmented reality engine based on head orientation data.

Clause 60 includes the method of Clause 58 or 59, further including associating an audio scene that is at least partially based on the audio data with a video scene corresponding to the augmented reality engine.

Clause 61 includes the method of any of Clauses 34 to 60, further including receiving the audio data from a second device.

Clause 62 includes the method of any of Clauses 34 to 61, further including receiving the direction data from the playback device.

Clause 63 includes the method of any of Clauses 34 to 62, further including transmitting the processed audio data to the playback device.

Clause 64 includes the method of any of Clauses 34 to 63, further including: generating sound based on the processed audio data; and providing sensor data to the one or more processors, wherein the direction data is based on the sensor data.

According to Clause 65, a device includes: a memory configured to store instructions; and a processor configured to execute the instructions to perform the method of any of Clauses 34 to 64.

According to Clause 66, a non-transitory computer-readable medium stores instructions that, when executed by a processor, cause the processor to perform the method of any of Clauses 34 to Clause 64.

According to Clause 67, an apparatus includes means for carrying out the method of any of Clauses 34 to Clause 64.

According to Clause 68, a non-transitory computer-readable medium includes instructions that, when executed by one or more processors, cause the one or more processors to: obtain audio data corresponding to a sound source and metadata indicative of a direction of the sound source; obtain direction data indicating a viewing direction associated with a user of a playback device; determine a resolution setting based on a similarity between the viewing direction and the direction of the sound source; and process the audio data based on the resolution setting to generate processed audio data.

According to Clause 69, an apparatus includes: means for obtaining audio data corresponding to a sound source and metadata indicative of a direction of the sound source; means for obtaining direction data indicating a viewing direction associated with a user of a playback device; means for determining a resolution setting based on a similarity between the viewing direction and the direction of the sound source; and means for processing the audio data based on the resolution setting to generate processed audio data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The foregoing techniques may be performed with respect to any number of different contexts and audio ecosystems. A number of example contexts are described below, although the techniques should not be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based on one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed includes an audio ecosystem that may include broadcast recording audio objects, professional audio systems, consumer on-device capture, ambisonics audio data format, on-device rendering, consumer audio, TV, and accessories, and car audio systems.

The broadcast recording audio objects, the professional audio systems, and the consumer on-device capture may all code their output using ambisonics audio format. In this way, the audio content may be coded using the ambisonics audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.).

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a sound field. For instance, the mobile device may acquire a sound field via the wired and/or wireless acquisition devices and/or the on-device surround sound capture (e.g., a plurality of microphones integrated into the mobile device). The mobile device may then code the acquired sound field into the ambisonics coefficients for playback by one or more of the playback elements. For instance, a user of the mobile device may record (acquire a sound field of) a live event (e.g., a meeting, a conference, a play, a concert, etc.), and code the recording into ambisonics coefficients.

The mobile device may also utilize one or more of the playback elements to playback the ambisonics coded sound field. For instance, the mobile device may decode the ambisonics coded sound field and output a signal to one or more of the playback elements that causes the one or more of the playback elements to recreate the sound field. As one example, the mobile device may utilize the wired and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D sound field and playback the same 3D sound field at a later time. In some examples, the mobile device may acquire a 3D sound field, encode the 3D sound field into ambisonics, and transmit the encoded 3D sound field to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of ambisonics signals. For instance, the one or more DAWs may include ambisonics plugins and/or tools which may be configured to operate with (e.g., work with) one or more game audio systems. In some examples, the game studios may output new stem formats that support ambisonics audio data. In any case, the game studios may output coded audio content to the rendering engines which may render a sound field for playback by the delivery systems.

The techniques may also be performed with respect to exemplary audio acquisition devices. For example, the techniques may be performed with respect to an Eigen microphone which may include a plurality of microphones that are collectively configured to record a 3D sound field. In some examples, the plurality of microphones of the Eigen microphone may be located on the surface of a substantially spherical ball with a radius of approximately 4 cm.

Another exemplary audio acquisition context may include a production truck which may be configured to receive a signal from one or more microphones, such as one or more Eigen microphones. The production truck may also include an audio encoder.

The mobile device may also, in some instances, include a plurality of microphones that are collectively configured to record a 3D sound field. In other words, the plurality of microphone may have X, Y, Z diversity. In some examples, the mobile device may include a microphone which may be rotated to provide X, Y, Z diversity with respect to one or more other microphones of the mobile device. The mobile device may also include an audio encoder.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. Moreover, in some examples, headphone playback devices may be coupled to a decoder via either a wired or a wireless connection. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a rendered to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), HOA coefficients corresponding to the 3D sound field may be obtained and transmitted to a decoder, the decoder may reconstruct the 3D sound field based on the HOA coefficients and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

It should be noted that various functions performed by the one or more components of the systems and devices disclosed herein are described as being performed by certain components. This division of components is for illustration only. In an alternate implementation, a function performed by a particular component may be divided amongst multiple components. Moreover, in an alternate implementation, two or more components may be integrated into a single component or module. Each component may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, circuits, and algorithm steps described in connection with the implementations disclosed herein may be implemented as electronic hardware, computer software executed by a processing device such as a hardware processor, or combinations of both. Various illustrative components, blocks, configurations, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM)), or any other form of non-transient storage medium known in the art. An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A playback device comprising:
a memory configured to store decoded audio data; and
one or more processors configured to:
receive an audio bitstream including encoded audio data and metadata sent from another device, the encoded audio data corresponding to one or more sound sources, and the metadata indicative of one or more directions of the one or more sound sources;
decode the encoded audio data of the audio bitstream to generate decoded audio data;
obtain direction data, at the playback device, that indicates a viewing direction associated with a user of the playback device;
obtain motion sensor data from one or more sensors coupled to the playback device;
adjust, to one or more adjusted directions, the one or more directions of the one or more sound sources indicated in the metadata to compensate for the motion sensor data;
determine a resolution setting that indicates a number of de-quantization bits used for rendering the decoded audio data for a first sound source of the one or more sound sources, the resolution setting for the first sound source based on a similarity between the viewing direction and a direction of the one or more adjusted directions corresponding to the first sound source; and
render the decoded audio data for the first sound source based on the motion sensor data and the resolution setting for the first sound source to generate rendered audio data for the first sound source.

2. The playback device of claim 1, wherein the one or more processors are configured to perform higher-resolution audio processing for one or more first sound sources, among the one or more sound sources, which are closer to the viewing direction than for one or more second sound sources, among the one or more sound sources, which are further from the viewing direction.

3. The playback device of claim 2, wherein the resolution setting corresponds to a lower resolution for the one or more second sound sources than for the one or more first sound sources after the motion sensor data is obtained.

4. The playback device of claim 1, wherein the resolution setting for a particular sound source corresponds to at least one of a coarse resolution level or a fine resolution level.

5. The playback device of claim 4, wherein the fine resolution level includes one or more of multiple fine resolution sub-levels.

6. The playback device of claim 1, wherein the resolution setting for each sound source indicates an amount of processing resources for the sound source including a number of bits to use for data representation to render the decoded audio data for the sound source.

7. The playback device of claim 1, wherein the one or more sensors are configured to generate the motion sensor data indicative of a movement of the head of the user, a pose of the head of the user, movement of the playback device, a pose of the playback device, or a combination thereof, to determine a head orientation of the user.

8. The playback device of claim 1, wherein the encoded audio data and the metadata, in the audio bitstream, are included in ambisonics transport format data that includes, for each particular sound source of the one or more sound sources:
a U-vector, of multiple U-vectors in the ambisonics transport format data, which corresponds to a sound energy from that particular sound source; and
a V-vector, of multiple V-vectors in the ambisonics transport format data, which corresponds to at least a direction of that particular sound source, and
wherein the encoded audio data is included in a particular U-vector of the multiple U-vectors and the metadata is included in a particular V-vector of the multiple V-vectors.

9. The playback device of claim 1, wherein the encoded audio data and the metadata, in the audio bitstream, are included in audio object coding format data that includes an audio signal and object direction metadata for each object of multiple objects, and wherein each of the one or more sound sources corresponds to a particular object of the multiple objects.

10. The playback device of claim 1, wherein the resolution setting for each sound source indicates a number of resolution levels of the encoded audio data to decode, a number of bits of the encoded audio data to decode, or a combination thereof.

11. The playback device of claim 1, wherein the one or more processors include a renderer configured to adjust a sound scene to compensate for translational movement of the user.

12. The playback device of claim 1, wherein the resolution setting for each sound source indicates an amount of processing resources for the sound source including a bit allocation that affects an amount of precision to use in arithmetic operations to render the decoded audio data.

13. The playback device of claim 1, wherein the resolution setting for a particular sound source other than the first sound source indicates whether to bypass the render of the decoded audio data for the particular sound source based on the similarity being less than a threshold similarity.

14. The playback device of claim 11, wherein the one or more processors include a renderer configured to adjust a sound scene to compensate for translational movement of the user, wherein the renderer is configured to perform foveated rendering of the decoded audio data, and wherein the resolution setting for the first sound source indicates at least one of a central vision area or a peripheral vision area associated with the viewing direction.

15. The playback device of claim 1, wherein the viewing direction corresponds to an orientation of the playback device represented by the motion sensor data.

16. The playback device of claim 15, wherein the viewing direction further corresponds to a gaze direction of the user.

17. The playback device of claim 1, wherein the one or more sensors include one or more inertial accelerometers, gyroscopes, compasses, positioning sensors, magnetometers, inclinometers, optical sensors, one or more other sensors to detect acceleration, location, velocity, acceleration, angular orientation, angular velocity, angular acceleration, or any combination thereof.

18. The playback device of claim 1, wherein the resolution setting is based on quantization zone data from a foveated rendering component of a virtual reality engine.

19. The playback device of claim 1, wherein the one or more processors are configured to associate an audio scene that is at least partially based on the decoded audio data with a video scene corresponding to an augmented reality engine.

20. The playback device of claim 1, further comprising a modem coupled to the one or more processors, the modem configured to receive the encoded audio data from the another device, transmit the direction data from the playback device, transmit the rendered audio data to the another device, or a combination thereof.

21. The playback device of claim 1, further comprising:
multiple loudspeakers configured to generate sound based on the rendered audio data; and
the one or more sensors configured to provide sensor data, including the motion sensor data, to the one or more processors.

22. The playback device of claim 1, wherein the one or more processors are integrated in at least one of a mobile phone, a tablet computer device, a wearable electronic device, a camera device, a virtual reality headset, a mixed reality headset, or an augmented reality headset.

23. The playback device of claim 1, wherein the one or more processors are integrated in a vehicle, the vehicle further including:
multiple loudspeakers configured to generate sound based on the rendered audio data; and
the one or more sensors configured to provide, to the one or more processors, sensor data, including the motion sensor data, indicative of the viewing direction of the user.

24. The playback device of claim 1, wherein the resolution setting for the first sound source indicates an amount of processing resources for the first sound source, and wherein the processing resources indicated by the resolution setting include particular processor cores on which computations are performed to render the decoded audio data.

25. A method comprising:
receiving, at one or more processors included in a playback device, an audio bitstream including encoded audio data and metadata sent from another device, the encoded audio data corresponding to one or more sound sources, and the metadata indicative of one or more directions of the one or more sound sources;
decoding, at the one or more processors, the encoded audio data of the audio bitstream to generate decoded audio data;
obtaining, at the one or more processors, direction data at the playback device, indicating a viewing direction associated with a user of the playback device;
obtaining motion sensor data, at the one or more processors, from one or more sensors coupled to the playback device;
adjusting, to one or more adjusted directions at the one or more processors, the one or more directions of the one or more sound sources indicated in the metadata to compensate for the motion sensor data;
determining, at the one or more processors, a resolution setting that indicates a number of de-quantization bits used for rendering the decoded audio data for a first sound source of the one or more sound sources, the resolution sitting for the first sound source based on a similarity between the viewing direction and a direction of the one or more adjusted directions corresponding to the first sound source; and
rendering, at the one or more processors, the decoded audio data for the first sound source based on the motion sensor data and the resolution setting for the first sound source to generate rendered audio data for the first sound source.

26. The method of claim 25, wherein the resolution setting for a particular sound source corresponds to at least one of a coarse resolution level or a fine resolution level.

27. The method of claim 25, wherein the one or more sensors generate the motion sensor data indicative of a movement of the head of the user, a pose of the head of the user, movement of the playback device, a pose of the playback device, or a combination thereof, to determine a head orientation of the user.

28. The method of claim 25, wherein the one or more sensors include one or more inertial accelerometers, gyroscopes, compasses, positioning sensors, magnetometers, inclinometers, optical sensors, one or more other sensors to detect acceleration, location, velocity, acceleration, angular orientation, angular velocity, angular acceleration, or any combination thereof.

29. A non-transitory computer-readable medium comprising instructions that, when executed by one or more processors of a playback device, cause the one or more processors to:
receive an audio bitstream including encoded audio data and metadata sent from another device, the encoded audio data corresponding to one or more sound sources, and the metadata indicative of one or more directions of the one or more sound sources;
decode the encoded audio data of the audio bitstream to generate decoded audio data;
obtain direction data, at the playback device, that indicates a viewing direction associated with a user of the playback device;
obtain motion sensor data from one or more sensors coupled to the playback device;
adjust, to one or more adjusted directions, the one or more directions of the one or more sound sources indicated in the metadata to compensate for the motion sensor data;
determine a resolution setting that indicates a number of de-quantization bits used for rendering the decoded audio data for a first sound source of the one or more sound sources, and the resolution setting for the first sound source based on a similarity between the viewing direction and a direction of the one or more adjusted directions corresponding to the first sound source; and render the decoded audio data for the first sound source based on the motion sensor data and the resolution setting for the first sound source to generate rendered audio data for the first sound source.

30. A playback device comprising:

means for receiving an audio bitstream including encoded audio data and metadata sent from another device, the encoded audio data corresponding to one or more sound sources, and the metadata indicative of one or more directions of the one or more sound sources;

means for decoding the encoded audio data of the audio bitstream to generate decoded audio data;

means for obtaining direction data at the playback device, indicating a viewing direction associated with a user of the playback device;

means for obtaining motion sensor data from one or more sensors coupled to the playback device;

means for adjusting, to one or more adjusted directions, the one or more directions of the one or more sound sources indicated in the metadata to compensate for the motion sensor data;

means for determining a resolution setting that indicates a number of de-quantization bits used for rendering the decoded audio data for a first sound source of the one or more sound sources, and the resolution setting for the first sound source based on a similarity between the viewing direction and a direction of the one or more adjusted directions corresponding to the first sound source; and means for rendering the decoded audio data for the first sound source based on the motion sensor data and the resolution setting for the first sound source to generate rendered audio data for the first sound source.

* * * * *